United States Patent
Ikegami et al.

(10) Patent No.: US 9,347,763 B2
(45) Date of Patent: May 24, 2016

(54) HYDRAULIC CYLINDER STROKE OPERATION DIAGNOSIS ASSISTING DEVICE AND HYDRAULIC CYLINDER STROKE OPERATION DIAGNOSIS ASSISTING METHOD

(71) Applicant: Komatsu Ltd., Tokyo (JP)

(72) Inventors: Katsuhiro Ikegami, Hiratsuka (JP); Yoshiki Kami, Hadano (JP); Yuki Shimano, Hirakata (JP); Yukinori Maeda, Ichinomiya (JP)

(73) Assignee: Komatsu Ltd., Tokyo (JP)

( * ) Notice: Subject to any disclaimer, the term of this patent is extended or adjusted under 35 U.S.C. 154(b) by 15 days.

(21) Appl. No.: 14/346,026

(22) PCT Filed: Apr. 12, 2013

(86) PCT No.: PCT/JP2013/061114
§ 371 (c)(1),
(2) Date: Mar. 20, 2014

(87) PCT Pub. No.: WO2014/167728
PCT Pub. Date: Oct. 16, 2014

(65) Prior Publication Data
US 2015/0047427 A1 Feb. 19, 2015

(51) Int. Cl.
*G01N 7/20* (2006.01)
*G01B 7/00* (2006.01)
(Continued)

(52) U.S. Cl.
CPC .............. *G01B 7/003* (2013.01); *E02F 9/2271* (2013.01); *E02F 9/2296* (2013.01); *E02F 9/264* (2013.01);
(Continued)

(58) Field of Classification Search
CPC .. F16K 37/0075; F02M 65/002; F02M 65/00; G01F 25/0007; G01N 21/274
USPC .............. 73/168, 37, 114.41, 114.51, 114.45; 702/100, 85
See application file for complete search history.

(56) References Cited

U.S. PATENT DOCUMENTS

| 7,124,045 B2 * | 10/2006 | Yamamoto et al. ........... 702/100 |
| 2004/0186681 A1 | 9/2004 | Harle |
| 2011/0014062 A1 * | 1/2011 | Imaizumi et al. ............... 417/46 |

FOREIGN PATENT DOCUMENTS

| CN | 2903517 Y | 5/2007 |
| CN | 100343620 C | 10/2007 |

(Continued)

OTHER PUBLICATIONS

Komatsu, Working Vehicle, Control Method of Working Vehicle, and Method for Oaubrat]ng Swash Plate Sensor of Hydrauuc Pump in Working Vehicle, JP 2010-174980.*
International Search Report dated May 14, 2013, issued for PCT/JP2013/061114.

Primary Examiner — Lisa Caputo
Assistant Examiner — Nigel Plumb
(74) Attorney, Agent, or Firm — Locke Lord LLP

(57) ABSTRACT

A hydraulic cylinder stroke operation diagnosis assisting device includes: movable portions that are sequentially supported by a vehicle body in a rotatable manner; a hydraulic cylinder between the vehicle body and each movable portion or between the movable portions to support the movable portions in a rotatable manner; a stroke sensor in the hydraulic cylinder to measure a stroke length of the hydraulic cylinder; a reset sensor measuring a reference reset point in which a value of the stroke length measured by the stroke sensor is reset; a stroke end detection unit detecting a stroke end position of the hydraulic cylinder; a calibration unit calibrating the measured value of the stroke length when the reference reset point and/or the stroke end position are detected; and a monitor displaying at least the measured value of the stroke length and a calibration state by the calibration unit.

5 Claims, 20 Drawing Sheets

(51) Int. Cl.
 E02F 9/22 (2006.01)
 E02F 9/26 (2006.01)
 G01M 13/00 (2006.01)
 F15B 15/28 (2006.01)
 F15B 19/00 (2006.01)
 G01D 5/14 (2006.01)

(52) U.S. Cl.
 CPC ......... *F15B 15/2807* (2013.01); *F15B 15/2815* (2013.01); *F15B 19/002* (2013.01); *G01M 13/00* (2013.01); *G01D 5/145* (2013.01)

(56) References Cited

FOREIGN PATENT DOCUMENTS

| | | |
|---|---|---|
| CN | 202001432 U | 10/2011 |
| CN | 202531534 U | 11/2012 |
| JP | 2004-132137 A | 4/2004 |
| JP | 2005-326302 A | 11/2005 |
| JP | 2006-258730 A | 9/2006 |
| JP | 2007-333628 A | 12/2007 |
| JP | 2010-174980 A | 8/2010 |

\* cited by examiner

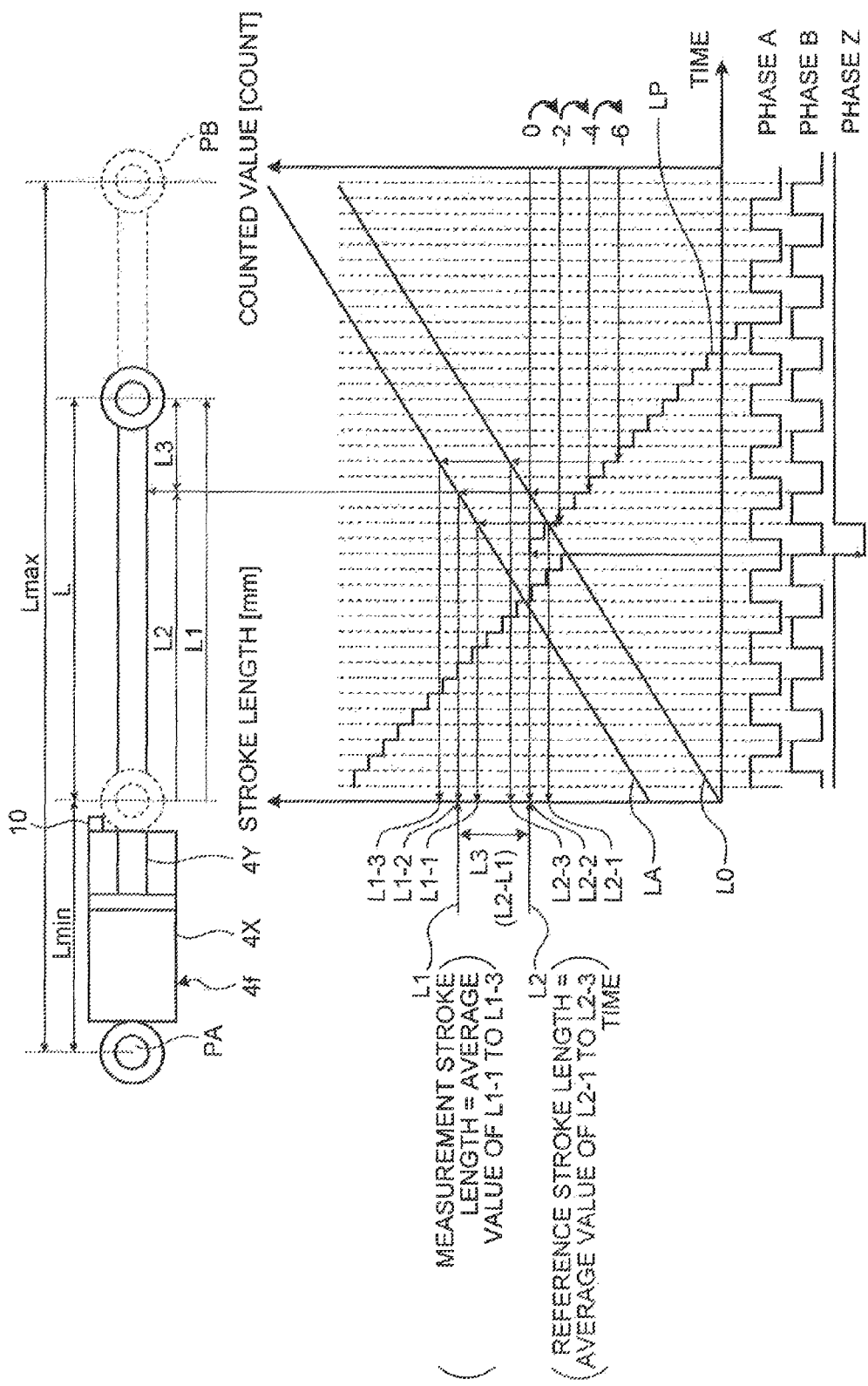

HYDRAULIC CYLINDER STROKE OPERATION DIAGNOSIS ASSISTING DEVICE AND HYDRAULIC CYLINDER STROKE OPERATION DIAGNOSIS ASSISTING METHOD

FIELD

The present invention relates to a hydraulic cylinder stroke operation diagnosis assisting device and a hydraulic cylinder stroke operation diagnosis assisting method.

BACKGROUND

An excavator which is one of construction machines includes a running body, an upper swing body that is provided on the running body in a swingable manner, and a working machine that is provided on the upper swing body. The working machine includes a boom of which one end is journaled onto a base portion, an arm of which one end is journaled to the other end of the boom, and an attachment that is journaled to the other end of the arm. The boom, the arm, and the attachment are driven by hydraulic cylinders. In order to detect the position and the posture of the working machine, the stroke of the hydraulic cylinder is measured.

For example, Patent Literature 1 discloses an excavator with a position sensor that detects a piston stroke position of the hydraulic cylinder driving the working machine by the rotation of a rotation roller on a cylinder rod. Since a slight slip occurs between the rotation roller and the cylinder rod, an error occurs between the actual stroke position and the stroke position obtained from the detection result of the position sensor. Therefore, in order to calibrate the stroke position obtained from the detection result of the position sensor to the reference position, a magnetic sensor as a reset sensor is provided at the reference position of an outer surface of a cylinder tube of the hydraulic cylinder. The stroke position which is detected by the position sensor when the piston passes by the reference position during the work is calibrated, and hence the accurate position may be measured.

CITATION LIST

Patent Literature

Patent Literature 1: Japanese Laid-open Patent Publication No. 2006-258730
Patent Literature 2: Japanese Laid-open Patent Publication No. 2007-333628

SUMMARY

Technical Problem

Incidentally, in order to highly precisely obtain the stroke length of the hydraulic cylinder, the above-described hydraulic cylinder includes a stroke sensor (position sensor) and a reset sensor that calibrates the measurement error of the stroke sensor. However, since the calibration of the stroke length is invisibly and automatically performed inside the device, the hydraulic cylinder stroke operation may not be easily diagnosed.

For example, when an operator informs that abnormality occurs in the hydraulic cylinder stroke operation, a service man diagnoses the operation state of the stroke sensor or the reset sensor, but the service man needs to measure the operation state by carrying an additional device dedicated for the diagnosis. In this case, the service man may perform an electric check such as a short-circuit detection occurring in the stroke sensor or the reset sensor, but may not easily detect, for example, mechanical abnormality such as a slip in the stroke sensor.

Furthermore, Patent Literature 2 discloses an excavator that displays a change in cylinder stroke position corresponding to a detent release position of a detent function of maintaining a working machine operation lever to a predetermined operation stroke position on a monitor screen.

The invention is contrived in view of the above-described circumstances, and an object thereof is to provide a hydraulic cylinder stroke operation diagnosis assisting device capable of easily diagnosis assisting a hydraulic cylinder stroke operation and a hydraulic cylinder stroke operation diagnosis assisting method thereof.

Solution to Problem

To overcome the problems and achieve the object, according to the present invention, a hydraulic cylinder stroke operation diagnosis assisting device comprises: movable portions that are sequentially supported by a vehicle body in a rotatable manner; a hydraulic cylinder that is disposed between the vehicle body and each movable portion or between the movable portions so as to support the movable portions in a rotatable manner; a stroke sensor that is disposed in the hydraulic cylinder so as to measure a stroke length of the hydraulic cylinder; a reset sensor that measures a reference reset point in which a value of the stroke length measured by the stroke sensor is reset; a stroke end detection unit that detects a stroke end position of the hydraulic cylinder; a calibration unit that calibrates the measured value of the stroke length when the reference reset point and/or the stroke end position are detected; and a monitor that displays at least the value of the stroke length measured by the stroke sensor and a calibration state by the calibration unit on a screen.

In the present invention, the monitor displays a correction value calculated by the calibration unit.

In the present invention, the monitor displays a plurality of the correction values continued in time series.

In the present invention, the reset sensor includes a rotary encoder that measures a rotation angle of each movable portion, and the reference reset point is a middle reset position other than the stroke end.

In the present invention, the reset sensor includes a magnetic sensor that is provided in an outer periphery of a cylinder tube of the hydraulic cylinder so as to detect a magnet disposed in a piston of a rod end of the hydraulic cylinder, and the reference reset point is a middle reset position other than the stroke end.

According to the present invention, A hydraulic cylinder stroke operation diagnosis assisting method comprises: detecting a reference reset point of a reset sensor and/or a stroke end position of a hydraulic cylinder to calibrate a stroke length of the hydraulic cylinder when the stroke length is measured by a stroke sensor disposed in the hydraulic cylinder; and displaying at least a value of the stroke length measured by the stroke sensor and a calibration state of the stroke length based on a detected result in the detecting.

According to the invention, since the monitor displays at least the stroke length measurement value by the stroke sensor and the calibration state by the calibration unit on the screen, it is possible to simply and easily perform diagnosis assistance of the hydraulic cylinder stroke operation.

BRIEF DESCRIPTION OF DRAWINGS

FIG. 7 is a schematic view describing a hydraulic cylinder stroke length and a stroke length calibration process.

FIG. 14-1 is a diagram illustrating an example of the initial stroke calibration operation assisting screen of the second embodiment displayed on the display unit of the HMI monitor.

FIG. 14-2 is a diagram illustrating an example of the initial stroke calibration operation assisting screen of the second embodiment displayed on the display unit of the HMI monitor.

FIG. 14-3 is a diagram illustrating an example of the initial stroke calibration operation assisting screen of the second embodiment displayed on the display unit of the HMI monitor.

FIG. 14-4 is a diagram illustrating an example of the initial stroke calibration operation assisting screen of the second embodiment displayed on the display unit of the HMI monitor.

FIG. 14-5 is a diagram illustrating an example of the initial stroke calibration operation assisting screen of the second embodiment displayed on the display unit of the HMI monitor.

FIG. 14-6 is a diagram illustrating an example of the initial stroke calibration operation assisting screen of the second embodiment displayed on the display unit of the HMI monitor.

FIG. 14-7 is a diagram illustrating an example of the initial stroke calibration operation assisting screen of the second embodiment displayed on the display unit of the HMI monitor.

FIG. 14-8 is a diagram illustrating an example of the initial stroke calibration operation assisting screen of the second embodiment displayed on the display unit of the HMI monitor.

FIG. 14-9 is a diagram illustrating an example of the initial stroke calibration operation assisting screen of the second embodiment displayed on the display unit of the HMI monitor.

FIG. 14-10 is a diagram illustrating an example of the initial stroke calibration operation assisting screen of the second embodiment displayed on the display unit of the HMI monitor.

DESCRIPTION OF EMBODIMENTS

Hereinafter, embodiments of the invention will be described with reference to the accompanying drawings. First, embodiments of the invention will be described. Hereinafter, an excavator as an example of a construction machine that may employ the spirit of the invention will be described.

First Embodiment

[Overall Configuration of Excavator]

Figure 1:
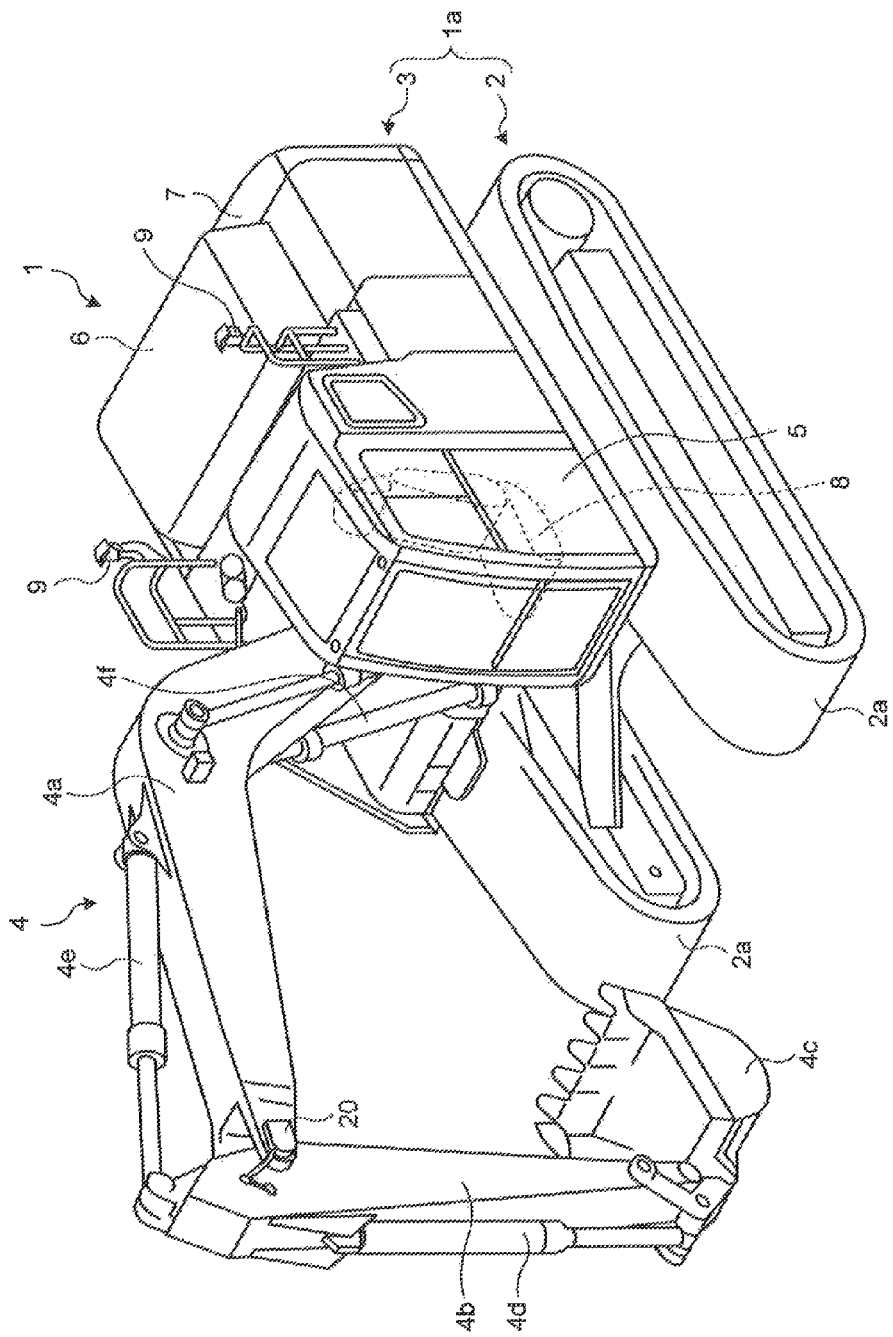
FIG. 1 is a perspective view illustrating the overall configuration of an excavator as an example of a construction machine that employs a hydraulic cylinder as an embodiment of the invention.

As illustrated in FIG. 1, an excavator 1 includes a lower running body 2, an upper swing body 3, and a working machine 4. The lower running body 2 may travel by the rotation of a pair of right and left crawler tracks 2a. The upper swing body 3 is provided in the lower running body 2 in a swingable manner. The working machine 4 is journaled to the front side of the upper swing body 3 so as to be movable upward and downward. The working machine 4 includes a boom 4a, an arm 4b, a bucket 4c as an example of an attachment, and hydraulic cylinders (a bucket cylinder 4d, an arm cylinder 4e, and a boom cylinder 4f).

A vehicle body 1a mainly includes the lower running body 2 and the upper swing body 3. The upper swing body 3 includes a cab 5 that is provided at the front left side (the front side of the vehicle) and includes an engine accommodating engine room 6 or a counter weight 7 that is provided at the rear side (the rear side of the vehicle). A driver seat 8 on which an operator sits is disposed inside the cab 5. Further, a plurality of antennas 9 are provided at both right and left sides of the rear upper surface of the upper swing body 3. Furthermore, in a first embodiment, the front side, the rear side, the right side, and the left side of the vehicle are defined based on the operator that sits on the driver seat 8 disposed inside the cab 5.

The boom 4a, the arm 4b, and the bucket 4c are sequentially supported by the vehicle body 1a in a rotatable manner, and the boom 4a, the arm 4b, and the bucket 4c respectively become movable portions with respect to the vehicle body 1a, the boom 4a, and the arm 4b.

A rotary encoder 20 is attached to the boom 4a. As will be described later, the rotary encoder 20 is also attached to the vehicle body. The rotation of the arm 4b with respect to the boom 4a is transmitted to the rotary encoder 20 that is attached to the boom 4a through a lever journaled to the arm 4b. The rotary encoder 20 outputs a pulse signal corresponding to the rotation angle of the arm 4b. The rotation of the boom 4a with respect to the vehicle body 1a is transmitted to the rotary encoder 20 that is attached to the vehicle body 1a through a lever journaled to the boom 4a. The rotary encoder 20 outputs a pulse signal corresponding to the rotation angle of the boom 4a.

[Circuit Configuration of Excavator]

Figure 2:
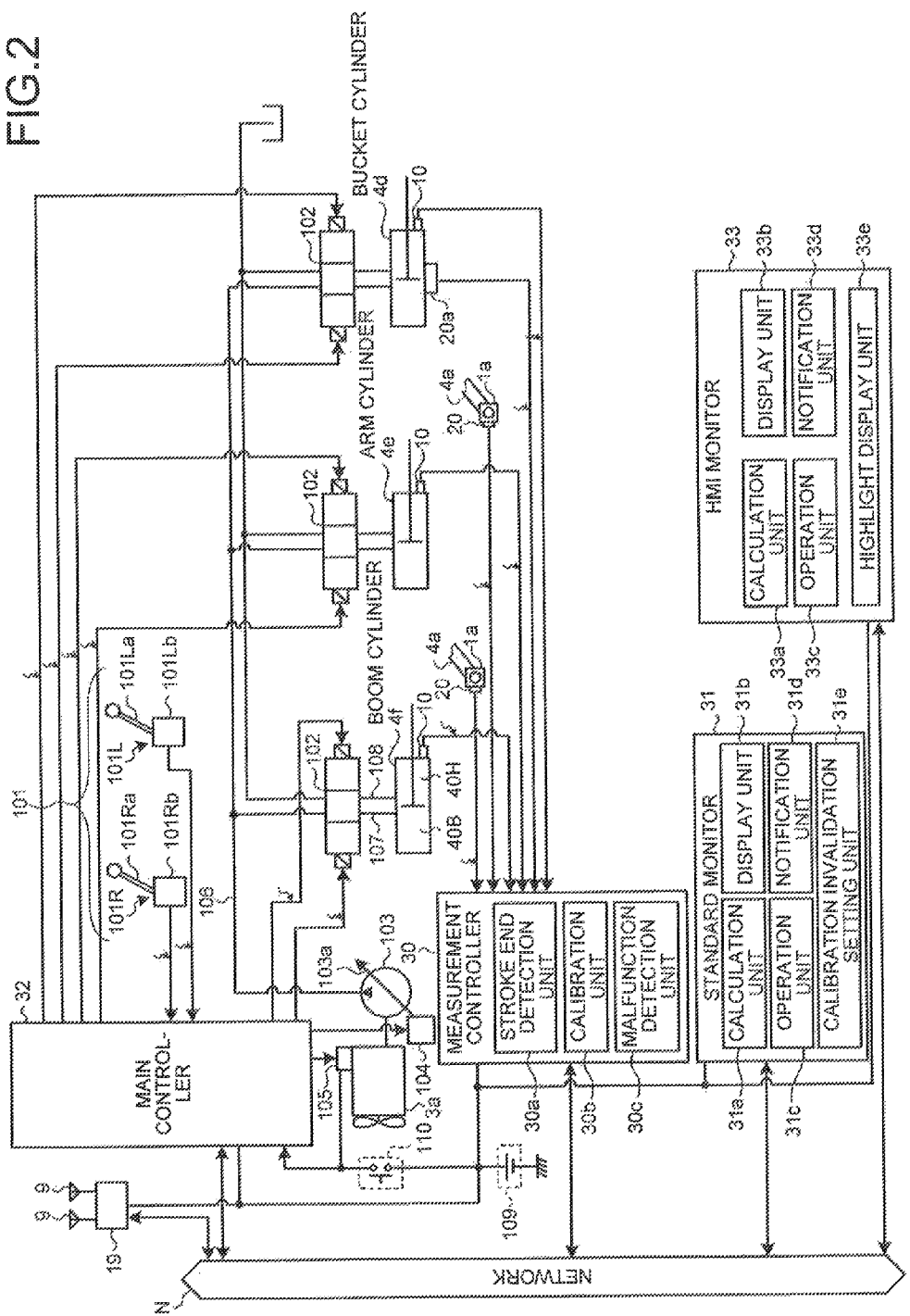
FIG. 2 is a block diagram illustrating the overall circuit configuration of the excavator that includes a hydraulic cylinder stroke operation diagnosis assisting device illustrated in FIG. 1.

Referring to FIGS. 1 and 2, the hydraulic circuit of the excavator 1 will be described. FIG. 2 is a block diagram illustrating the overall circuit configuration of the excavator that includes a hydraulic cylinder stroke operation diagnosis assisting device illustrated in FIG. 1. Hereinafter, a description will be made by focusing on the boom cylinder of the hydraulic cylinder. Furthermore, although it is not described, the operations of the arm cylinder 4e and the bucket cylinder 4d other than the boom cylinder 4f are also diagnosed in the same way. In FIG. 2, an electric signal of an electric operation lever unit 101 is input to a main controller 32. Then, when the electric control signal of the main controller 32 is supplied to a control valve 102 of the boom cylinder 4f, the boom cylinder 4f is driven.

As illustrated in FIG. 1, the working machine 4 is provided with the boom 4a, the arm 4b, and the bucket 4c, and the boom 4a, the arm 4b, and the bucket 4c are respectively operated when the boom cylinder 4f, the arm cylinder 4e, and the bucket cylinder 4d corresponding thereto are driven.

The boom cylinder 4f is driven by using, for example, a variable displacement type hydraulic pump 103 as a drive source. The hydraulic pump 103 is driven by an engine 3a. A swash plate 103a of the hydraulic pump 103 is driven by a servo mechanism 104. The servo mechanism 104 is operated in response to the control signal (electric signal) output from the main controller 32, and the position of the swash plate 103a of the hydraulic pump 103 changes in response to the control signal. Further, an engine driving mechanism 105 of the engine 3a is operated in response to the control signal (electric signal) output from the main controller 32, and the engine 3a rotates at the engine speed corresponding to the control signal.

The ejection port of the hydraulic pump 103 communicates with the control valve 102 through an ejection passageway 106. The control valve 102 communicates with a cap-side oil chamber 40B and a rod-side oil chamber 40H of the boom cylinder 4f through passageways 107 and 108. The hydraulic oil that is ejected from the hydraulic pump 103 is supplied to the control valve 102 through the ejection passageway 106. The hydraulic oil that passes through the control valve 102 is supplied to the cap-side oil chamber 40B or the rod-side oil chamber 40H of the boom cylinder 4f through the passageway 107 or the passageway 108.

A stroke sensor 10 is attached to the boom cylinder 4f. The stroke sensor 10 measures the stroke of the piston. The rotary encoder 20 that serves as a reset sensor is attached to a portion that axially supports one end of the boom 4a in the vehicle body 1a. The rotary encoder 20 detects the rotation angle of the boom 4a, and outputs a pulse signal in response to the rotation angle. The stroke sensor 10 and the rotary encoder 20 are respectively connected to a measurement controller 30.

A battery 109 is a power supply that activates the main controller 32. The measurement controller 30, a standard monitor 31, and an HMI (Human Machine Interface) monitor 33 as a computerized construction guidance monitor are electrically connected to the battery 109. The main controller 32 is electrically connected to the battery 109 through an engine key switch 110.

When the engine key switch 110 is switched on, the battery 109 is electrically connected to a startup motor (not illustrated) of the engine 3a so as to start the engine 3a, and the battery 109 is electrically connected to the main controller 32 so as to activate the main controller 32. When the engine key switch 110 is switched off, the electric connection between the main controller 32 and the battery 109 is interrupted, so that the engine 3a is stopped and the activation of the main controller 32 is stopped.

The main controller 32, the measurement controller 30, the standard monitor 31, the HMI monitor 33, and a position information detecting unit 19 are connected to one another via an in-vehicle network N. A switch state signal that represents the switch state (on and off state) of the engine key switch 110 is input from the main controller 32 to the measurement controller 30, the standard monitor 31, and the HMI monitor 33 via the network N. When the switch state signal that is input to the measurement controller 30, the standard monitor 31, and the HMI monitor 33 represents the on state, the measurement controller 30, the standard monitor 31, and the HMI monitor 33 are activated. Then, when the switch state signal represents the off state, the activation of the measurement controller 30, the standard monitor 31, and the HMI monitor 33 is stopped.

Operation lever units 101R and 101L respectively include, for example, operation levers 101Ra and 101La that are provided inside the cab 5 and detection units 101Rb and 101Lb that detects operational signals which represent the operation directions and the operation amounts of the operation levers 101Ra and 101La. The operation signals that are detected by the detection units 101Rb and 101Lb are input to the main controller 32. The control valve 102 is connected to the main controller 32 via an electric signal line. Furthermore, the operation lever units 101R and 101L are a pair of right and left levers. The operation lever unit 101R is used to operate the boom 4a and the bucket 4c, and the operation lever unit 101L is used to operate the swing operations of the arm 4b and the upper swing body 3. Furthermore, the swing actuator of the upper swing body 3 is not illustrated in the drawings.

Here, for example, when the operation lever 101Ra is operated, an operation signal of the operation lever 101Ra is input to the main controller 32, and the main controller 32 generates a control signal for operating the control valve 102. The control signal is supplied from the main controller 32 to the control valve 102 through an electric signal line, so that the valve position of the control valve 102 changes.

[Configuration of Hydraulic Cylinder Stroke Operation Diagnosis Assisting Device]

Subsequently, the hydraulic cylinder stroke operation diagnosis assisting device will be described. The hydraulic cylinder stroke operation diagnosis assisting device includes the hydraulic cylinder (the bucket cylinder 4d, the arm cylinder 4e, and the boom cylinder 4f), the measurement controller 30, the standard monitor 31, the HMI monitor 33, and the main controller 32.

The stroke sensor 10 that detects the stroke amount of the hydraulic cylinder as the rotation amount is attached to each of the arm cylinder 4e and the boom cylinder 4f. Further, the stroke sensor 10 and a magnetic sensor 20a are attached to the bucket cylinder 4d.

The rotary encoder 20 that outputs a pulse signal in response to the rotation amounts (angles) of the arm 4b and the boom 4a is attached to a rotation shaft supporting portion of the arm 4b and the boom 4a. The pulse signal is a rectangular wave.

The stroke sensor 10, the rotary encoder 20, and the magnetic sensor 20a are electrically connected to the measurement controller 30. The measurement controller 30 includes a calibration unit 30b. The calibration unit 30b calibrates the stroke lengths that are measured by the stroke sensors 10 of the bucket cylinder 4d, the arm cylinder 4e, and the boom cylinder 4f based on the detection signals of the stroke sensor 10, the rotary encoder 20, and the magnetic sensor 20a. That is, the stroke lengths that are measured by the stroke sensors 10 of the bucket cylinder 4d and the arm cylinder 4e are respectively calibrated based on the measurement results of the corresponding rotary encoders 20. Further, the stroke length that is measured by the stroke sensor 10 of the bucket cylinder 4d is calibrated based on the measurement result of the magnetic sensor 20a that serves as a reset sensor. Furthermore, the measurement controller 30 calculates the position and the posture of the bucket 4c based on the respective measured stroke lengths of the hydraulic cylinders.

Further, the measurement controller 30 includes a stroke end detection unit 30a. The stroke end detection unit 30a detects whether the piston reaches the stroke end, that is, the maximum stroke position or the minimum stroke position. The stroke end detection unit 30a determines that the piston reaches the stroke end when three conditions are satisfied in which the operation levers 101Ra and 101La are operated, the stroke position measured by the stroke sensor 10 is within, for example, 3 mm from the predetermined stroke end position, and the piston movement speed is equal to or slower than, for example, ±3 mm/sec as the minute movement amount. Furthermore, the piston movement speed may be obtained by performing a temporal differentiation on the stroke position detected by the stroke sensor 10. Furthermore, whether the piston reaches the stroke end may be determined based on the relief state in which the ejection pressure of the hydraulic pump 103 exceeds a predetermined pressure. Then, the calibration unit 30b resets the stroke length when the piston reaches the stroke end other than the case of resetting the stroke length by the magnetic sensor 20a and the rotary encoder 20 as the reset sensors.

Further, the measurement controller 30 includes a malfunction detection unit 30c. The malfunction detection unit 30c outputs an error in which the stroke is abnormal when the measured stroke length exceeds a predetermined value in which the stroke length is larger than the stroke range defined by the minimum stroke end position and the maximum stroke end position.

The standard monitor 31 includes a calculation unit 31a, a display unit 31b, an operation unit 31c, a notification unit 31d, and a calibration invalidation setting unit 31e. The calculation unit 31a performs a communication with the main controller 32 or the measurement controller 30 so as to obtain various information items, displays the obtained various information items on the display screen of the display unit 31b, and outputs various instruction information items input from the operation unit 31c to the display unit 31b and the other controllers. Further, the notification unit 31d is configured as a buzzer or the like, and outputs sound or the like to the outside when an alarm for an error is needed. The calibration invalidation setting unit 31e validates or invalidates the reset process of the reset sensor to be described below. Furthermore, the display unit 31b may be a touch panel serving as the operation unit 31c.

The HMI monitor 33 includes a calculation unit 33a, a display unit 33b, an operation unit 33c, a notification unit 33d, and a highlight display unit 33e. The calculation unit 33a performs a communication with the main controller 32 or the measurement controller 30 so as to obtain various information items, displays the obtained various information items on the display screen of the display unit 33b, and outputs various instruction information items input from the operation unit 33c to the display unit 33b and the other controllers. Further, the notification unit 33d is configured as a buzzer or the like, and outputs sound to the outside when an alarm for an error is needed. Furthermore, in the HMI monitor 33, the display unit 33b is configured as the touch panel serving as the operation unit 33c, but these components may be separately provided. Further, the HMI monitor 33 assists the initial calibration operation by changing the initial stroke operation assisting screen to be described later. Furthermore, the position information detecting unit 19 calculates the position and the direction of the excavator 1 based on the position information obtained through the antennas 9, and transmits the result to the main controller 32 and the HMI monitor 33, thereby enabling the computerized construction.

[Arrangement and Operation of Stroke Sensor]

Next, the stroke sensor 10 will be described with reference to FIGS. 3 and 4. Here, for convenience of the description, the stroke sensor 10 that is attached to the boom cylinder 4f will be described, but the stroke sensor 10 is also attached to the arm cylinder 4e.

Figure 3:
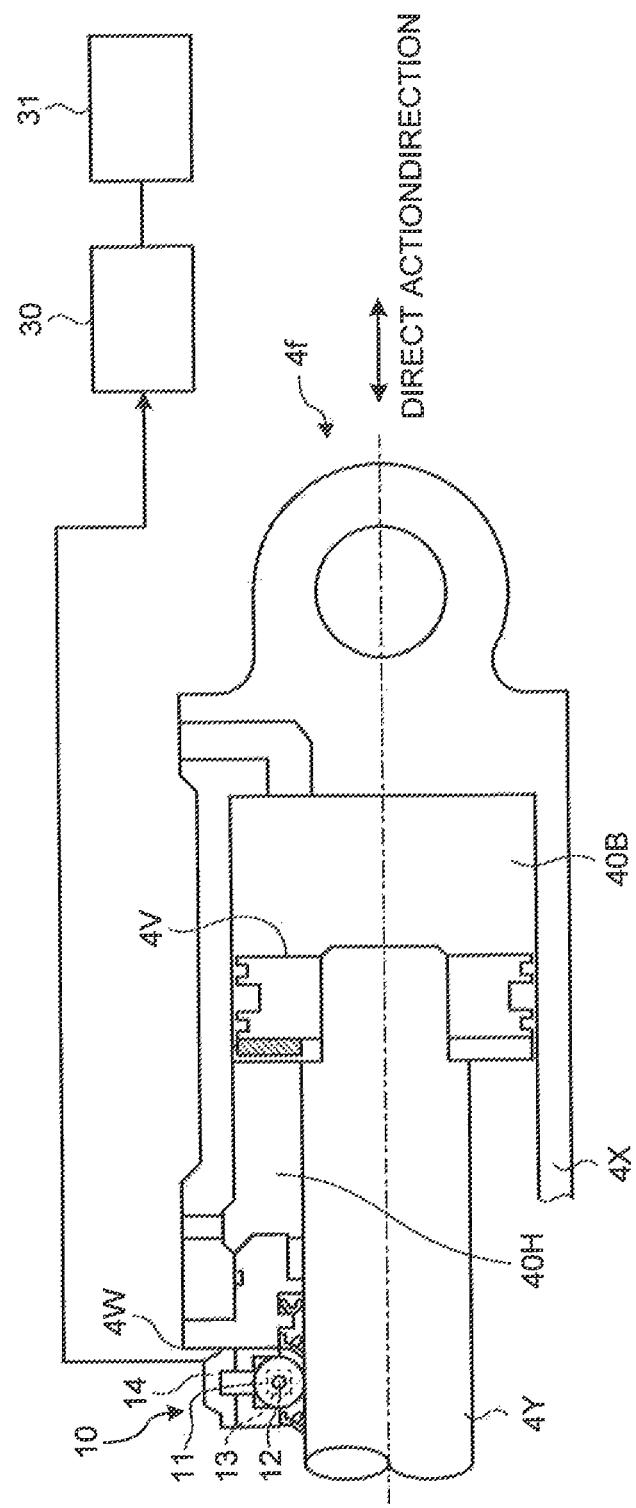
FIG. 3 is a schematic view illustrating the arrangement configuration of a stroke sensor with respect to a hydraulic cylinder.

As illustrated in FIG. 3, the boom cylinder 4f includes a cylinder tube 4X and a cylinder rod 4Y that is movable relative to the cylinder tube 4X inside the cylinder tube 4X. A piston 4V is provided inside the cylinder tube 4X in a slidable manner. The cylinder rod 4Y is attached to the piston 4V. The cylinder rod 4Y is provided in a cylinder head 4W in a slidable manner. A chamber that is defined by the cylinder head 4W, the piston 4V, and the cylinder inner wall is the rod-side oil chamber 40H. An oil chamber opposite to the rod-side oil chamber 40H with the piston 4V interposed therebetween is the cap-side oil chamber 40B. Furthermore, the cylinder head 4W is provided with a seal member that seals a gap formed between the cylinder head and the cylinder rod 4Y so as to prevent dust or the like from intruding into the rod-side oil chamber 40H.

The cylinder rod 4Y retreats while being contracted when the hydraulic oil is supplied to the rod-side oil chamber 40H and the hydraulic oil is discharged from the cap-side oil chamber 40B. Further, the cylinder rod 4Y extends in a manner such that the hydraulic oil is discharged from the rod-side oil chamber 40H and the hydraulic oil is supplied to the cap-side oil chamber 40B. That is, the cylinder rod 4Y directly acts in the right and left direction of the drawing.

A casing 14 that covers the stroke sensor 10 and accommodates the stroke sensor 10 therein is provided at a position near the cylinder head 4W at the outside of the rod-side oil chamber 40H. The casing 14 is fastened to the cylinder head 4W by a bolt or the like so as to be fixed to the cylinder head 4W.

The stroke sensor 10 includes a rotation roller 11, a rotation shaft 12, and a rotation sensor unit 13. The rotation roller 11 is provided so as to be rotatable in response to the direct action of the cylinder rod 4Y while the surface of the rotation roller 11 contacts the surface of the cylinder rod 4Y. That is, the linear movement of the cylinder rod 4Y is converted into the rotation by the rotation roller 11. The rotation shaft 12 is disposed so as to be perpendicular to the direct action direction of the cylinder rod 4Y.

The rotation sensor unit 13 is configured to detect the rotation amount (rotation angle) of the rotation roller 11 as an electric signal. A signal representing the rotation amount (rotation angle) of the rotation roller 11 detected by the rotation sensor unit 13 is sent to the measurement controller 30 via the electric signal line, and the measurement controller 30 converts the signal into the position (stroke position) of the cylinder rod 4Y of the boom cylinder 4f.

Figure 4:
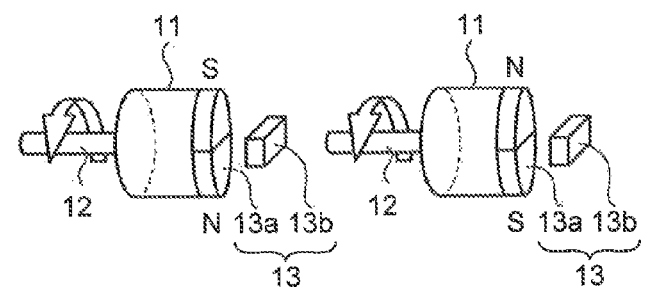
FIG. 4 is a schematic view illustrating the outline configuration and the operation of the stroke sensor.
Figure 4:
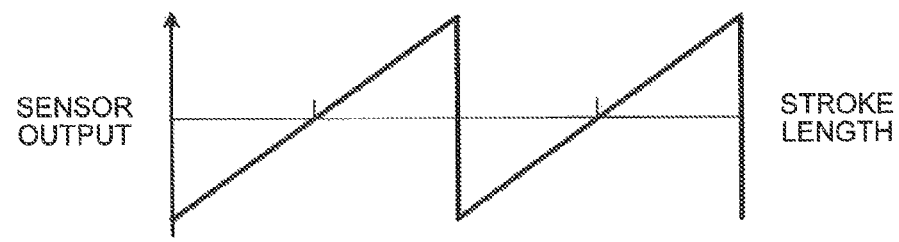

As illustrated in FIG. 4, the rotation sensor unit 13 includes a magnet 13a and a hall IC 13b. The magnet 13a as a detection medium is attached to the rotation roller 11 so as to rotate along with the rotation roller 11. The magnet 13a rotates in response to the rotation of the rotation roller 11 rotating about the rotation shaft 12. The magnet 13a is configured so that the N and S poles are alternately changed in response to the rotation angle of the rotation roller 11. The magnet 13a is configured so that the magnetic force (magnetic flux density) detected by the hall IC 13b periodically changes every period set as one revolution of the rotation roller 11.

The hall IC 13b is a magnetic sensor that detects the magnetic force (magnetic flux density) generated by the magnet 13a as an electric signal. The hall IC 13b is provided at a position that is distant from the magnet 13a by a predetermined distance along the axial direction of the rotation shaft 12.

The electric signal that is detected by the hall IC 13b is sent to the measurement controller 30, and the measurement controller 30 converts the electric signal of the hall IC 13b into the rotation amount of the rotation roller 11, that is, the displacement amount (stroke length) of the cylinder rod 4Y of the boom cylinder 4f. Specifically, the displacement amount in which the cylinder rod 4Y directly acts when the rotation roller 11 rotates once is calculated as 2πd by using the rotation radius d of the rotation roller 11.

Here, the relation between the rotation angle of the rotation roller 11 and the electric signal (voltage) detected by the hall IC 13b will be described with reference to FIG. 4. When the rotation roller 11 rotates and the magnet 13a rotates in response to the rotation, the magnetic force (magnetic flux density) transmitted through the hall IC 13b periodically changes in response to the rotation angle, and the electric signal (voltage) as the sensor output periodically changes. The rotation angle of the rotation roller 11 may be measured from the magnitude of the voltage output from the hall IC 13b.

Further, the engine speed of the rotation roller 11 may be measured by counting the number of repeating each period of the electric signal (voltage) output from the hall IC 13b. Then, the displacement amount (stroke length) of the cylinder rod 4Y of the boom cylinder 4f is measured based on the rotation angle of the rotation roller 11 and the engine speed of the rotation roller 11.

[Operation of Rotary Encoder]

Figure 5:
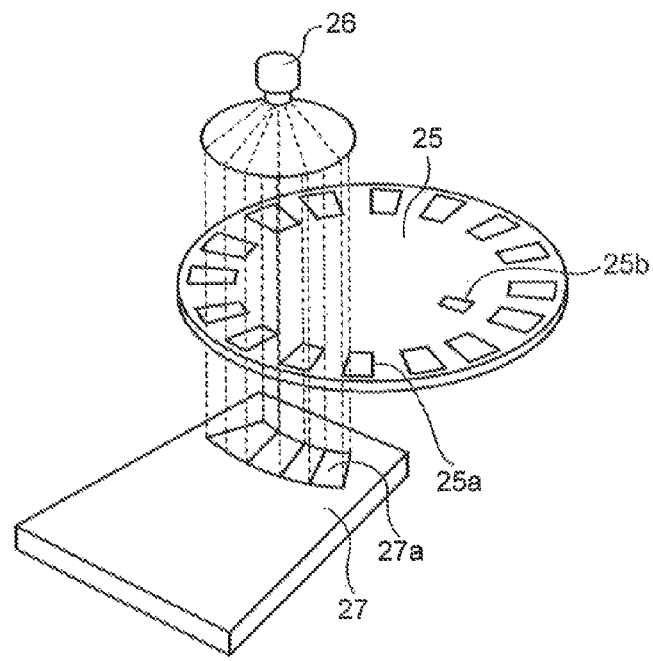
FIG. 5 is a schematic view illustrating the outline configuration of a rotary encoder as a reset sensor.

As illustrated in FIG. 5, the rotary encoder 20 includes a disk portion 25, a light emitting portion 26, and a light receiving portion 27. The light emitting portion 26 and the light receiving portion 27 are disposed 30 with the disk portion 25 interposed therebetween. The light emitting portion 26 includes a light emitting element that emits light to the light receiving portion 27. The light receiving portion 27 includes four light receiving elements 27a that may receive light emitted from the light emitting portion 26. The four light receiving elements 27a have the same width W, and are continuously arranged in a series in an arc shape. The light receiving element 27a converts the received light amount into an electric signal. A plurality of first transmission portions 25a that are used to transmit the light emitted from the light emitting portion 26 to the light receiving portion 27 are disposed in the disk portion 25. The first transmission portions 25a are formed as substantially rectangular slits that extend in the radial direction at the circumferential width of 2 W and are arranged near the outer periphery of the disk portion 25 at the interval of 2 W in an annular shape parallel to the outer periphery. A single transmission portion 25b is disposed at the inner periphery of the ring that is formed by the first transmission portions 25a. The transmission portion 25b is a substantially rectangular slit that extends in the radial direction.

The disk portion 25 rotates while being synchronized with the rotation of the boom 4a with respect to the vehicle body 1a. The four light receiving elements 27a respectively output electric signals in response to the amount of the light transmitted through the first and second transmission portions 25a and 25b by the rotation of the disk portion 25. In the light receiving portion 27, the electric signals that are output from first and third light receiving elements and second and fourth light receiving elements 27a among the light receiving elements 27a that are disposed in series are converted into the pulse signals in response to the amount of the light transmitted through the first and second transmission portions 25a and 25b. Then, the light receiving portion 27 outputs the converted pulse signals to the measurement controller 30. The reason why the electric signals output from two light receiving elements 27a are used to generate one pulse signal is that the robustness of the sensor with respect to the external light needs to be improved.

Further, when the light receiving element 27a outputs the electric signal by the light transmitted through the transmission portion 25b, the light receiving portion 27 outputs the corresponding pulse signal. That is, the light receiving portion 27 outputs three pulse signals generated in response to the rotation angle of the disk portion 25. Since the rotation angle of the disk portion 25 is equal to the rotation angle of the boom 4a, the pulse signal is output in response to the rotation angle of the boom cylinder 4f.

Specifically, the rotary encoder 20 is of an incremental type, and is configured to output an A-phase pulse signal, a B-phase pulse signal of which the phase is different from that of the phase A by 90°, and a Z-phase pulse signal (reference pulse signal) generated once when the light is transmitted through the transmission portion 25b by one revolution of the disk portion 25. The measurement controller 30 counts the number of the rise and fall of the A-phase and B-phase pulse signals. The counted number is proportional to the rotation amount of the boom cylinder 4f. The measurement controller 30 determines the rotation direction of the boom 4a from the phase difference between the phase A and the phase B. Further, the reference position of the rotation of the boom 4a is measured by the Z-phase pulse signal, and the counted number is cleared. The substantial center of the rotatable angle range of the boom 4a is set as the reference position. The measurement controller 30 monitors the counted value of the rotary encoder 20, stores a predetermined number of strokes every predetermined counted value, and stores the average value as the reference reset point (middle reset position) of the setting reference position. The Z-phase pulse signal is output when the light transmitted through the transmission portion 25a corresponding to the phase Z is interrupted by the disk portion 25. That is, the Z-phase pulse signal is detected when the pulse signal falls.

The rotary encoder 20 outputs the Z-phase pulse signal at the substantially center angle of the rotatable angle range of the boom 4a. That is, the rotary encoder 20 outputs the Z-phase pulse signal at the substantially center of the stroke range of the boom cylinder 4f. In the first embodiment, the middle reset position of the rotary encoder 20 is set as described above, but the arbitrary position other than the stroke end of the hydraulic cylinder may be set as the middle reset position.

[Measurement and Calibration of Stroke Length by Measurement Controller]

Figure 6:
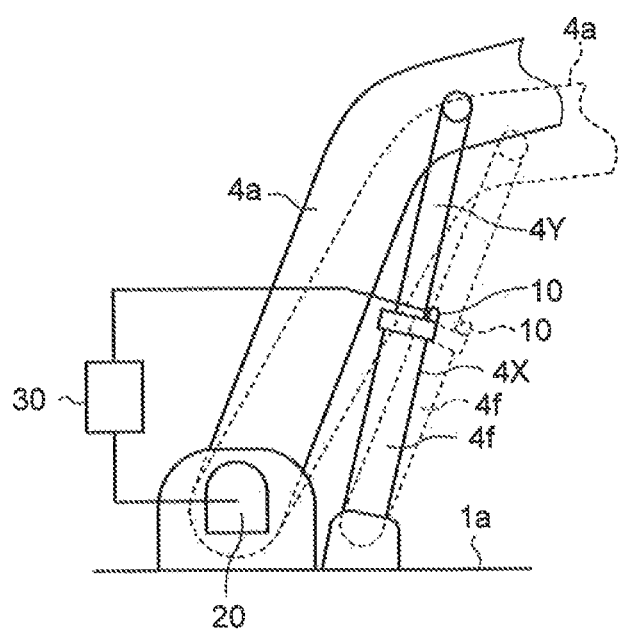
FIG. 6 is a schematic view illustrating an elevation state of a boom of the excavator.

Next, the measurement and the calibration of the stroke length by the measurement controller 30 will be described. Here, examples of the measurement and the calibration of the stroke length during the elevation of the boom 4a will be described. As illustrated in FIG. 6, the boom 4a is elevated by the telescopic movement of the boom cylinder 4f. The boom cylinder 4f reaches the extension-side stroke end when the boom 4a moves to the uppermost position and reaches the contraction-side stroke end when the boom 4a moves to the lowermost position. The stroke length of the boom cylinder 4f at this time is measured from the rotation amount of the rotation roller 11 of the stroke sensor 10.

Here, a slight slip inevitably occurs between the rotation roller 11 of the stroke sensor 10 and the cylinder rod 4Y. In particular, a large slip occurs when there is a collision between the cylinder tube 4X and the piston 4V at the stroke end position or the impact to the cylinder rod 4Y during the work. Due to this slip, an error (accumulated error) occurs between the stroke measurement position of the cylinder rod 4Y obtained from the detection result of the stroke sensor 10 and the actual position of the cylinder rod 4Y. Therefore, in order to calibrate the stroke measurement value obtained from the detection result of the stroke sensor 10, the rotary encoder 20 as the reset sensor is provided. The rotation roller 11 and the rotary encoder 20 are connected to the measurement controller 30, and the measurement controller 30 calibrates the stroke length measured by the stroke sensor 10 based on the pulse signal output from the rotary encoder 20.

As illustrated in FIG. 6, when the boom cylinder 4f is extended, the boom 4a moves upward. The stroke length of the boom cylinder 4f at this time is measured by the stroke sensor 10. Meanwhile, in the rotary encoder 20, the disk portion 25 rotates in a manner such that the boom 4a rotates with respect to the vehicle body 1a in response to an increase in the height of the boom 4a. At this time, the light that is emitted from the light emitting portion 26 and is transmitted through the transmission portions 25a and 25b of the disk portion 25 is received by the light receiving portion 27. Accordingly, the pulse signal that is generated in response to the rotation angle of the disk portion 25 is output from the light receiving portion 27. The A-phase, B-phase, and Z-phase pulse signals are respectively output from the light receiving portion 27. The Z-phase pulse signal is involved with the reference angle as the predetermined rotation angle of the boom 4a, and is output when the boom 4a reaches the position of the reference angle.

Figures 1, 14:
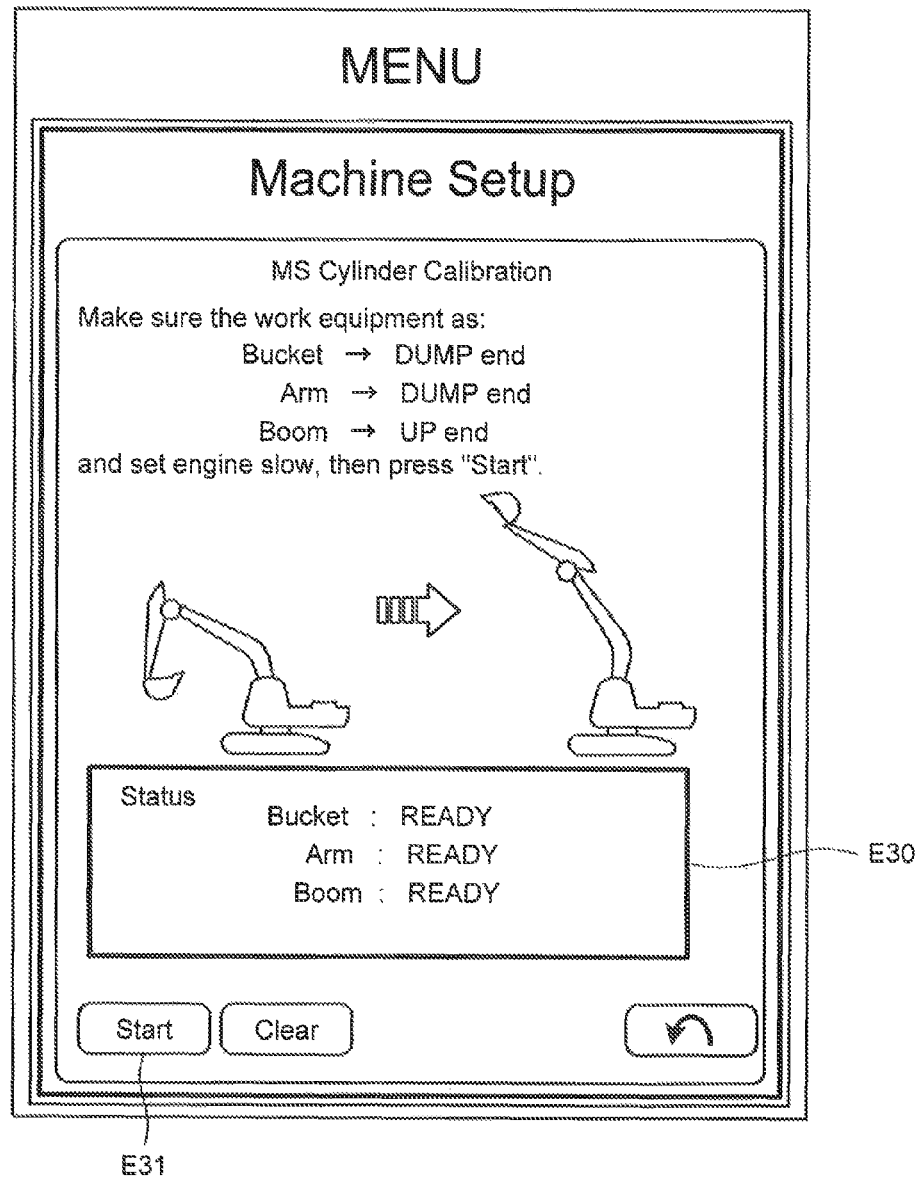
Figures 2, 14:
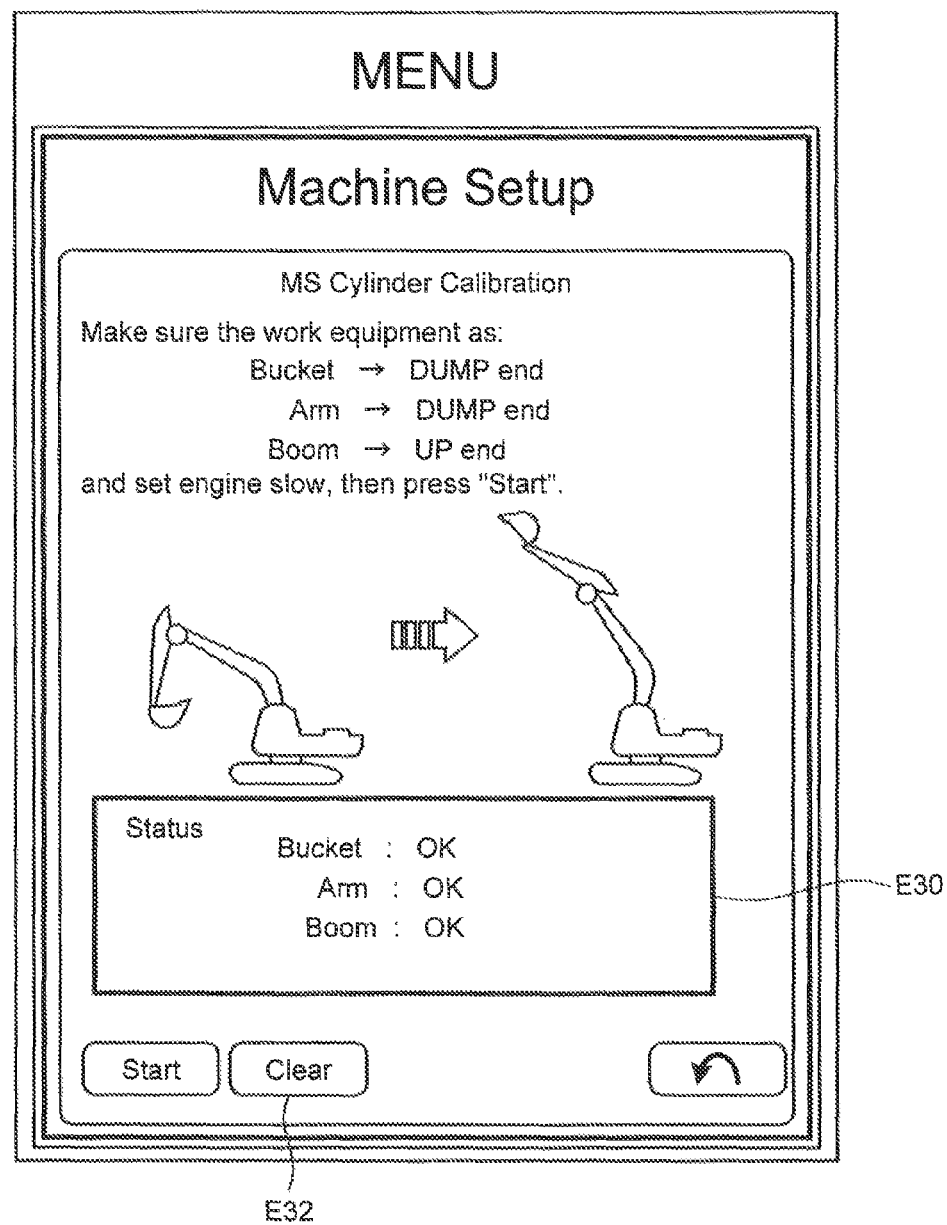
Figures 3, 14:
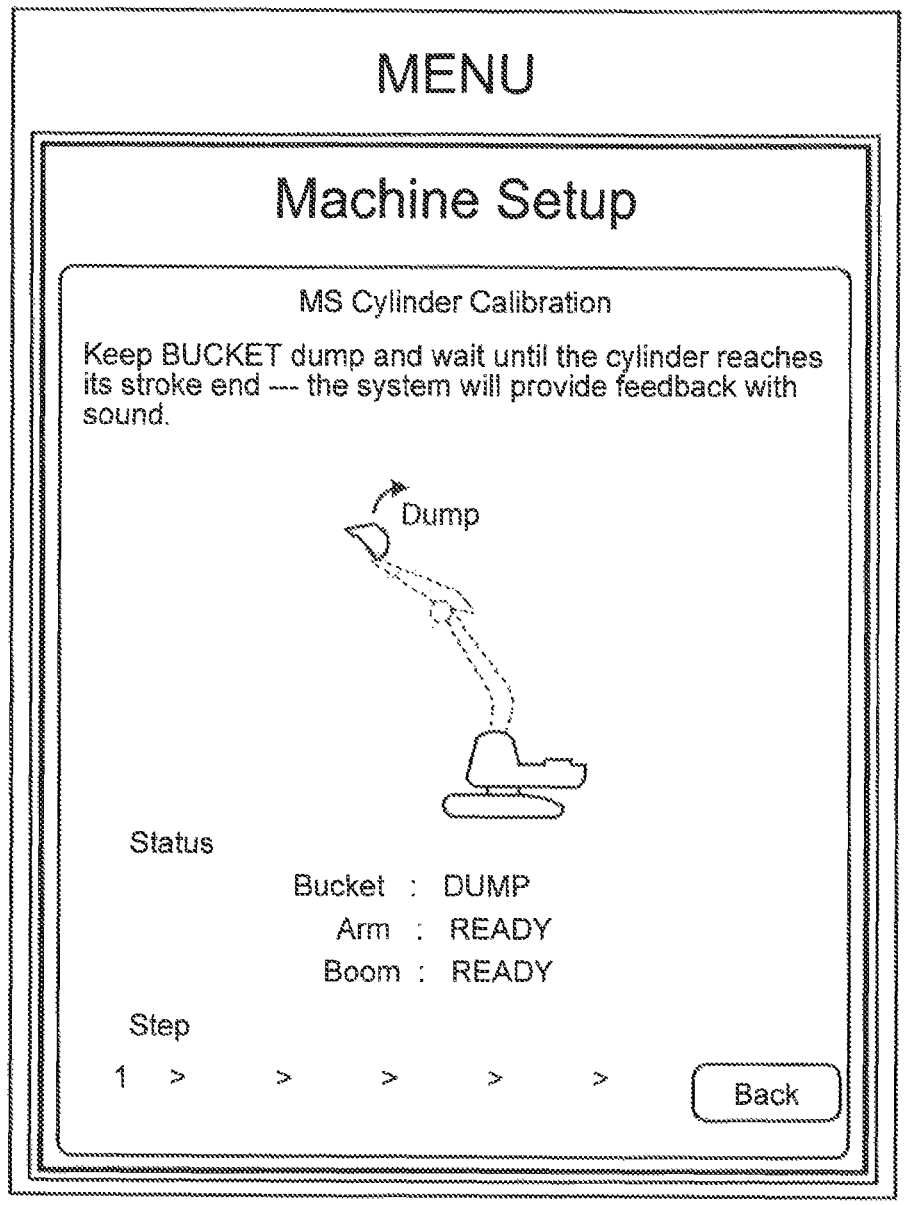
Figures 4, 14:
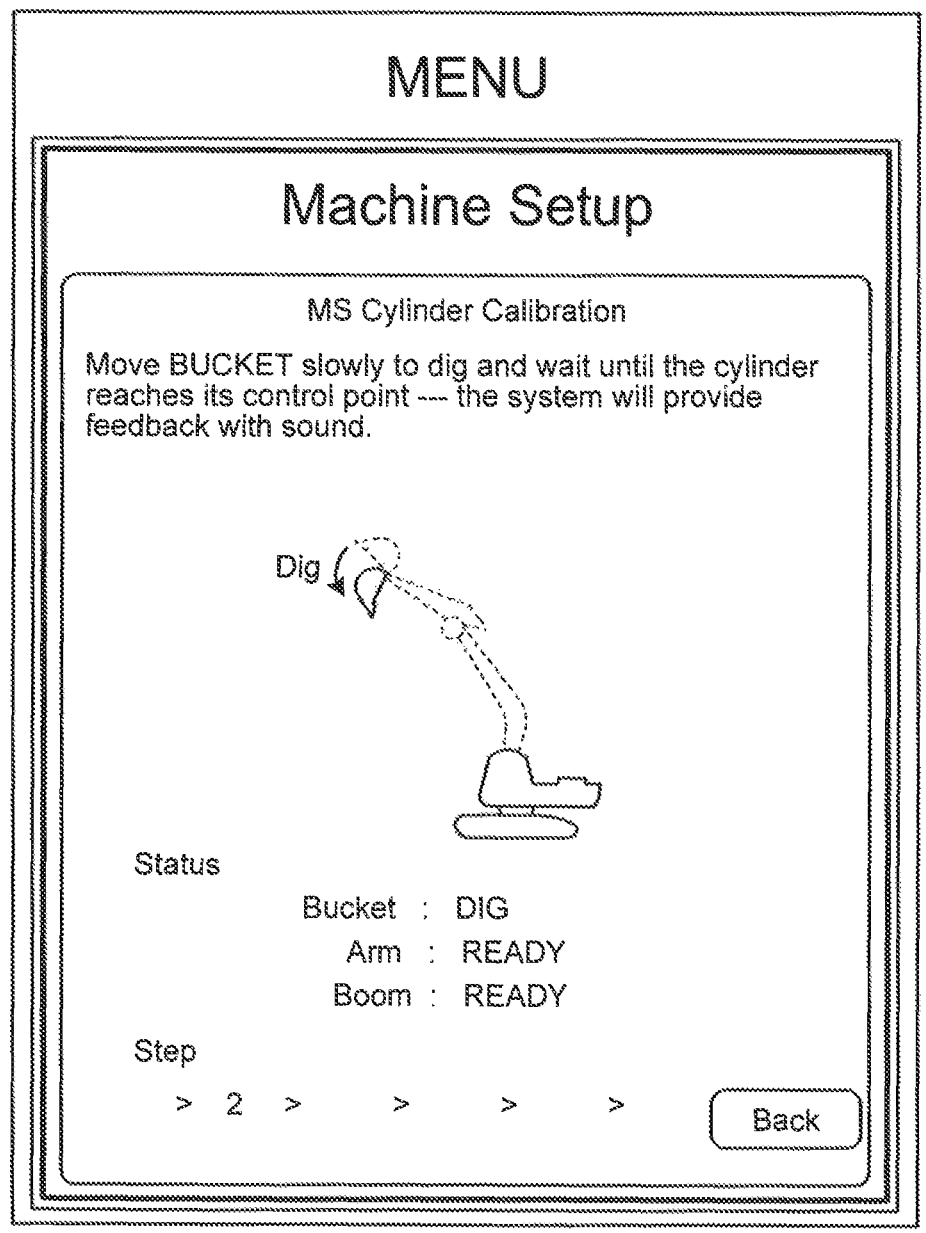
Figures 5, 14:
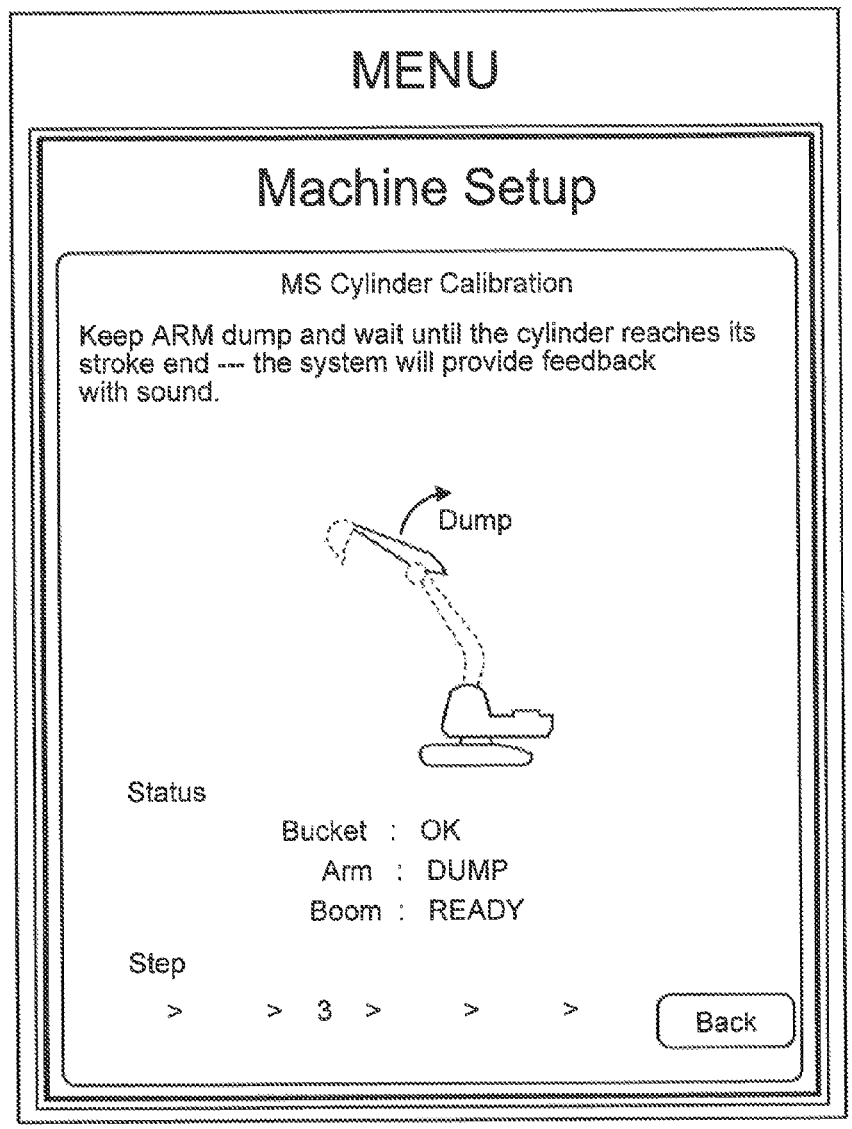
Figures 6, 14:
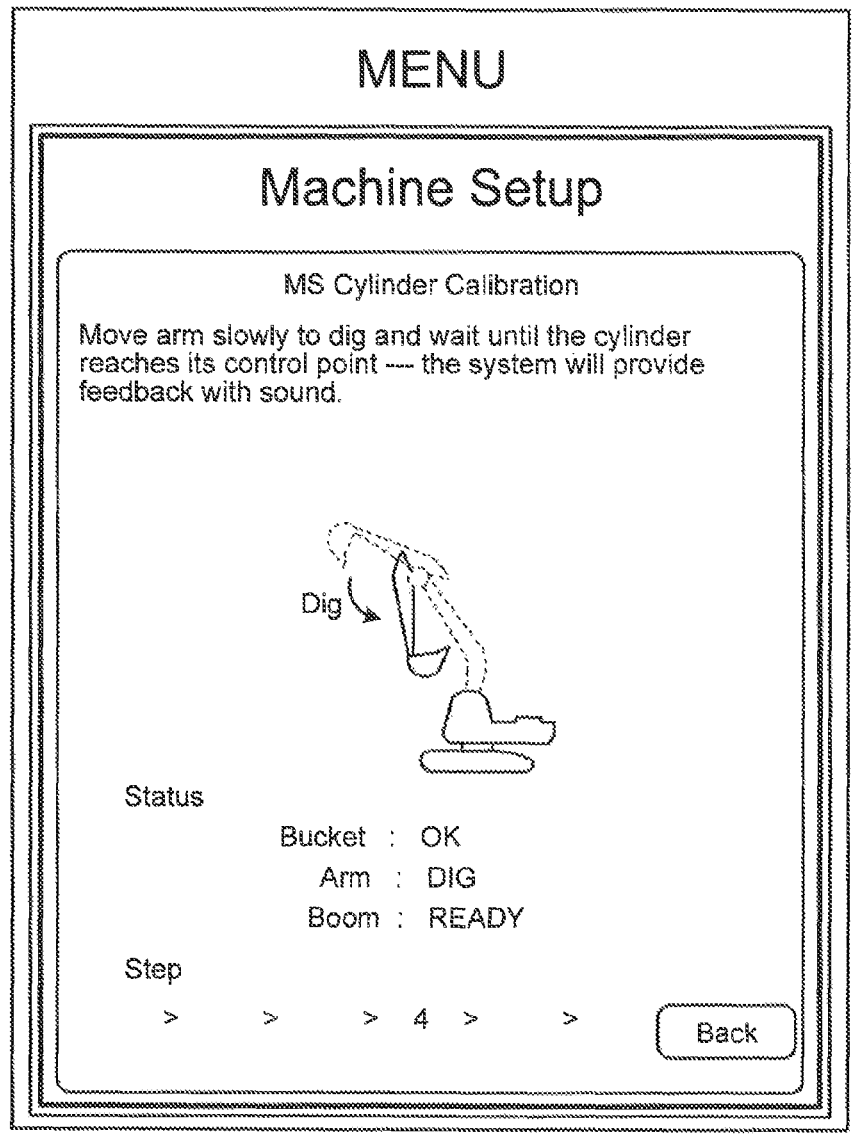
Figures 7, 14:
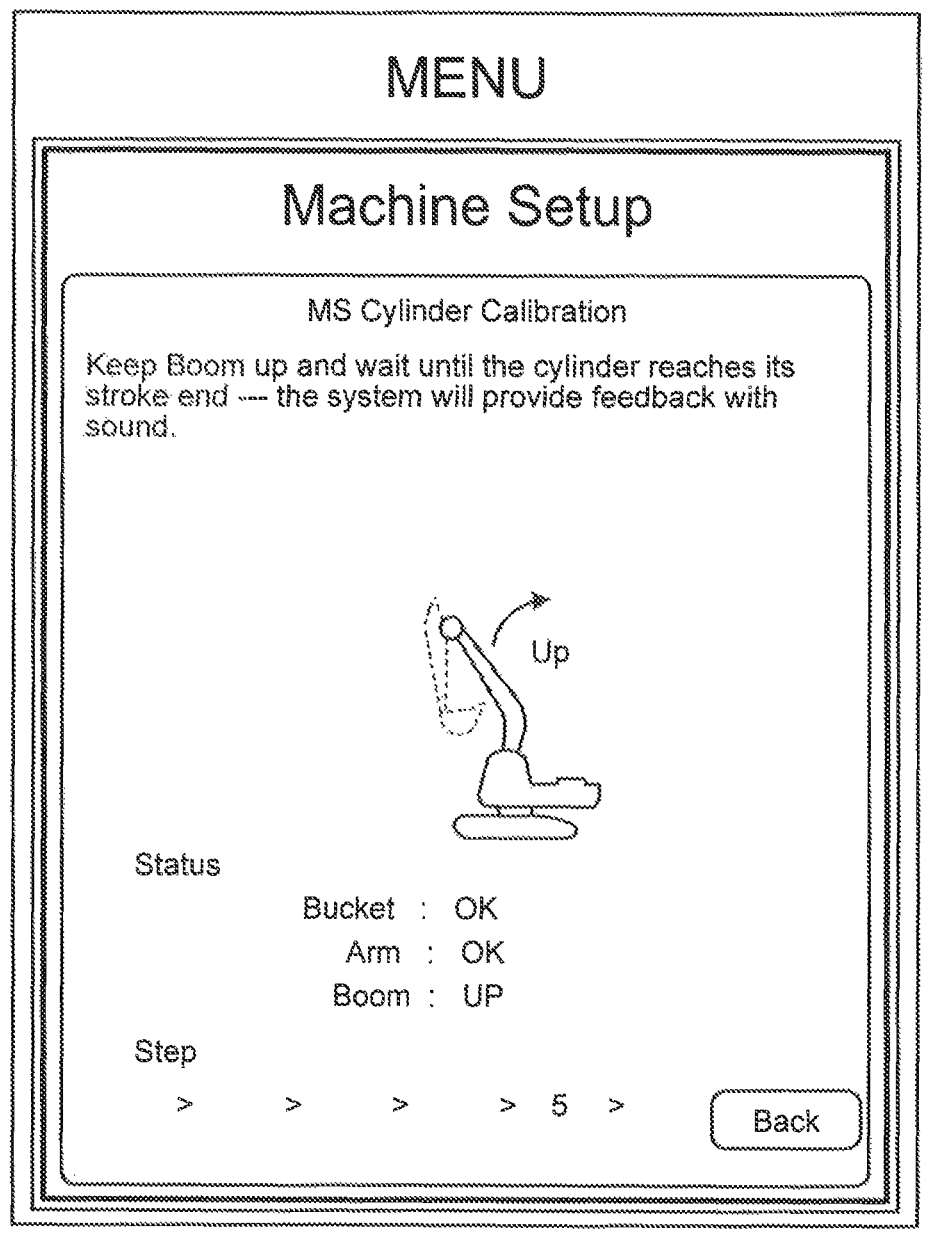
Figures 8, 14:
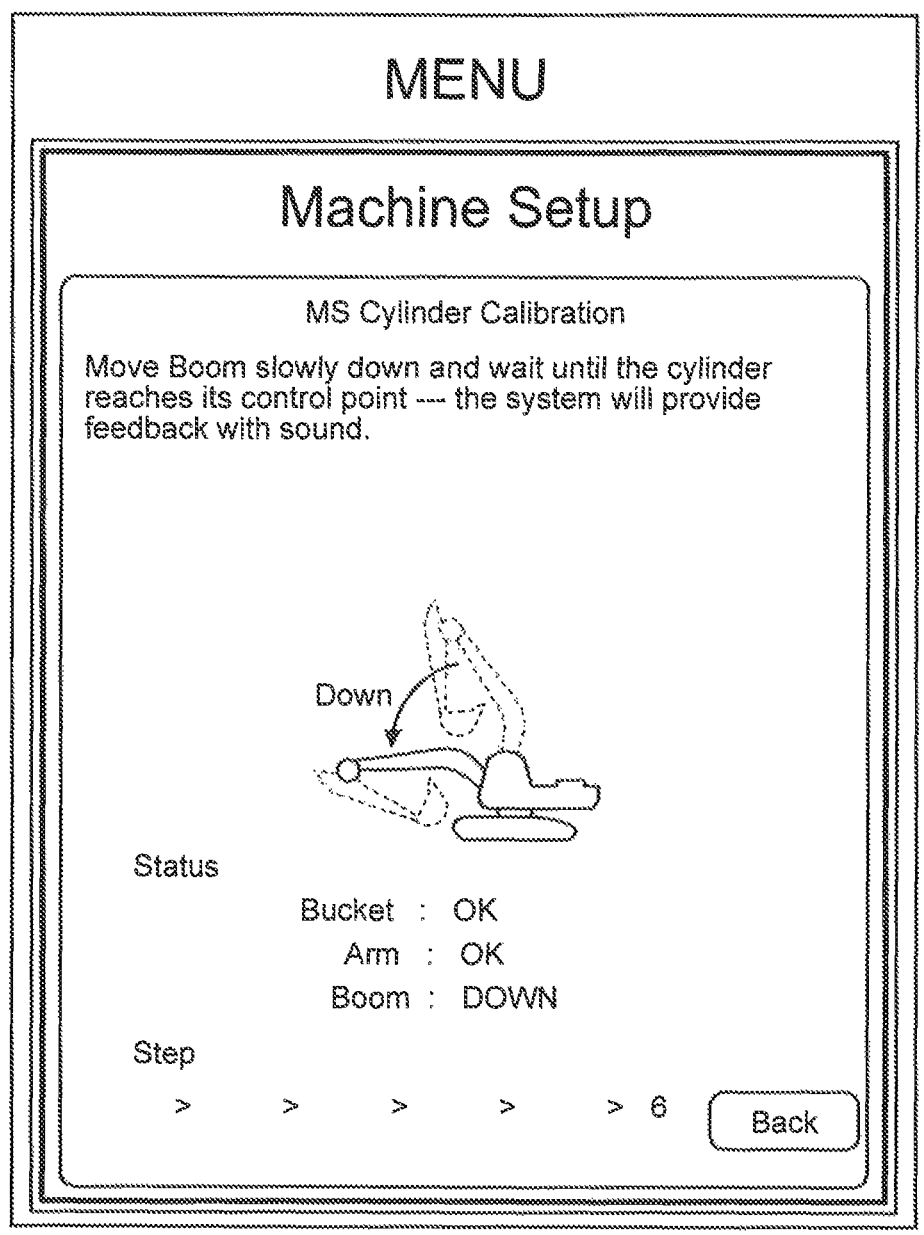
Figures 9, 14:
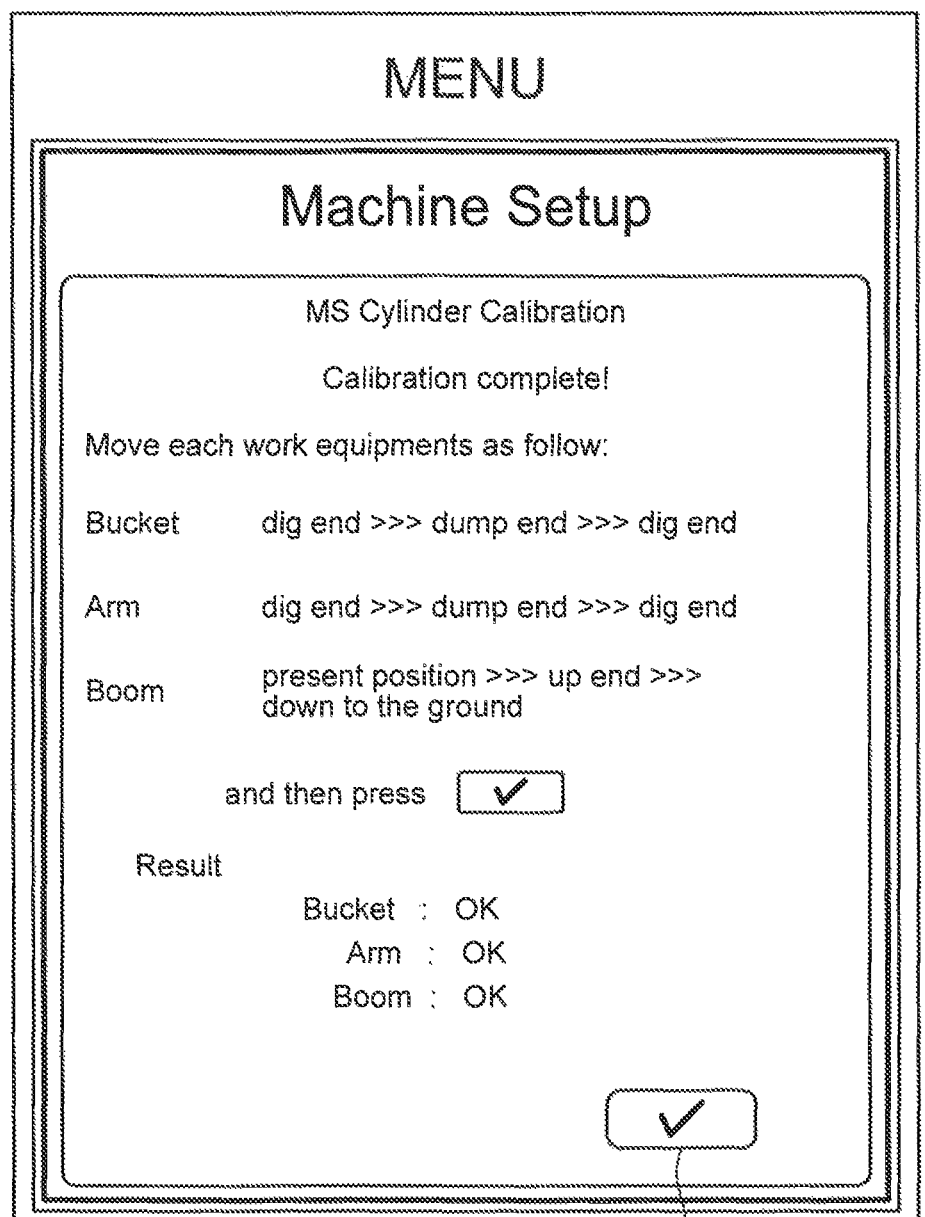
Figures 10, 14:
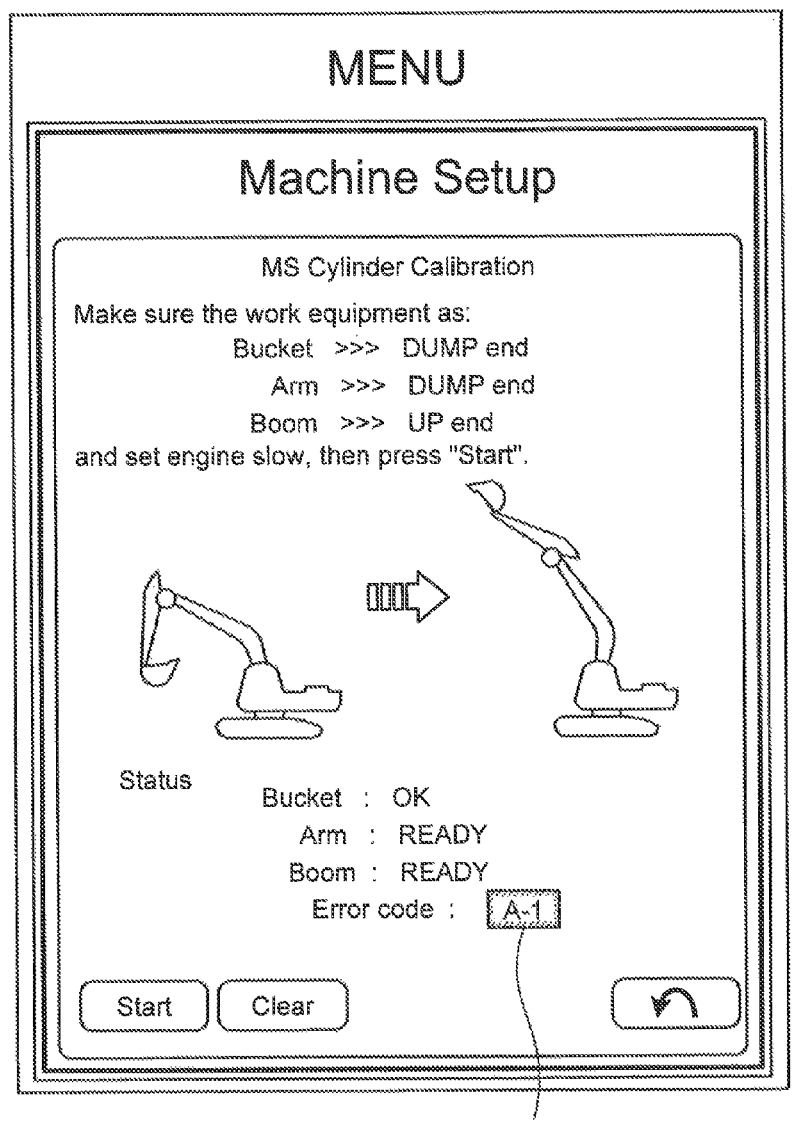

Here, as illustrated in FIG. 7, the measurement controller 30 stores a reference stroke length L2 during the initial calibration. Here, the initial calibration indicates an operation in which the reference stroke length L2 is obtained and stored when the excavator 1 is shipped from a factory or the rotary encoder 20 or the magnetic sensor 20a as the reset sensor is replaced. During the initial calibration, the measurement controller 30 first detects the fall of the Z-phase pulse, stores the stroke lengths L2-1 to L2-3 of the boom cylinder 4f corresponding to the values counted a predetermined integer number of times (here, every multiple number of −2, three times) in the rotary encoder 20, and stores the average value as the reference stroke length L2. Furthermore, in FIG. 7, L0 indicates a change in stroke length during the initial calibration, LA indicates a change in stroke length other than the initial calibration, and LP indicates a change in the counted value of the rotary encoder 20.

Meanwhile, in a case where the measurement controller 30 detects the Z-phase pulse signal during the normal operation of the boom cylinder 4f, the measurement controller detects the extension length by the stroke lengths L1-1 to L1-3 of the boom cylinder 4f corresponding to the values counted a predetermined integer number of times (here, every multiple number of 2, three times) in the rotary encoder 20. The measurement controller 30 stores the stroke lengths L1-1 to L1-3 measured a predetermined number of times and stores the average value as the measurement stroke length L1.

As described above, the measurement controller 30 stores the reference stroke length L2 that is calculated and stored by the initial calibration and is set by the values counted a predetermined integer number of times in the rotary encoder 20. The measurement controller 30 calculates a difference L3 between the measurement stroke length L1 detected in the normal operation other than the initial calibration and the reference stroke length L2 detected in the initial calibration.

Then, the measurement controller 30 calibrates the measurement value of the stroke sensor 10 using the difference L3 when the boom cylinder 4f is stopped after the measurement is performed by the normal operation of the boom cylinder 4f through the detection of the Z-phase pulse signal.

That is, the measurement controller 30 detects whether the boom 4a reaches a reference rotation angle by the fall of the Z-phase of the rotary encoder 20, detects the rotation of the boom from the rotation angle to a predetermined angle, stores the stroke length of the boom cylinder 4f a predetermined number of times in the meantime, and stores the average value (the measurement stroke length L1). Further, the measurement controller calculates a deviation (difference L3) by comparing the measurement stroke length L1 with the reference stroke length L2 stored in advance by the initial calibration. Then, the measurement controller performs a calibration process in which the deviation is included in the measurement value when the boom 4a is stopped.

[Correction of Magnetic Sensor and Calibration of Stroke Length]

Since there are many chances that the bucket cylinder 4d contacts water or soil compared to the boom cylinder 4f and the arm cylinder 4e, the rotary encoder 20 may not be attached to the bucket cylinder 4d. For this reason, in the bucket cylinder 4d, the magnetic sensor 20a as the reset sensor is attached to the outer periphery of the cylinder tube 4X as described above, and calibration is performed which resets the stroke position obtained from the detection result of the stroke sensor 10 to the middle reset position (origin position).

Figure 8:
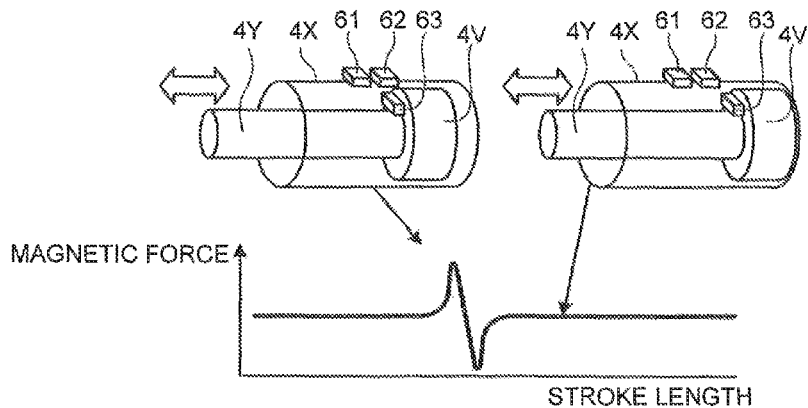
FIG. 8 is a schematic view illustrating the outline configuration and the operation of a magnetic sensor as a reset sensor.

As illustrated in FIG. 8, the magnetic sensor 20a is attached to the outside of the cylinder tube 4X. The magnetic sensor 20a includes two magnetic sensors 61 and 62 that are disposed in the direct action direction of the piston 4V while being distant from each other by a predetermined distance. The magnetic sensors 61 and 62 are provided at the existing middle reset position (origin position). The piston 4V is provided with a magnet 63 that generates a magnetic force line. The magnetic sensors 61 and 62 detect a magnetic force (magnetic flux density) by the transmission of the magnetic force line generated by the magnet 63 and output electric signals (voltages) in response to the magnetic force (magnetic flux density). The signals that are detected by the magnetic sensors 61 and 62 are sent to the measurement controller 30. In the measurement controller 30, calibration is performed which resets the stroke position obtained from the detection result of the stroke sensor 10 to the middle reset position (origin position) based on a change in the detection results of the magnetic sensors 61 and 62. The calibration content is the same as that of the rotary encoder 20.

[Correction Prohibition Process Control During Activation of Power Supply of Device]

Incidentally, there is a case in which the stroke length may change due to the weight of the working machine when the working machine is not kept in a stable posture in a non-power-supply state where the stroke length is not detected (a state where power is not supplied to the main controller 30). In this case, a deviation occurs between the actual stroke length of the hydraulic cylinder and the measurement stroke length that is measured immediately after the non-power-supply state. Here, if there is a deviation between the actual stroke length and the final measurement stroke length when the power supply is activated, the malfunction detection unit 30c generates an alarm using a buzzer or the like by determining that an error occurs, and hence the operation of the working machine is disturbed.

For this reason, the measurement controller 30 performs control which prohibits the stroke length calibration process until the stroke length passes by the middle reset position of the reset sensor so as to be reset when the power supply is activated. In other words, an error occurrence alarm is not generated by allowing the deviation between the actual stroke length and the final measurement stroke length until the stroke length passes by the middle reset position of the reset sensor.

Here, the process procedure of the calibration prohibition process control when the power supply is activated will be described with reference to FIG. 9. First, the measurement controller 30 determines whether the power supply is activated (step S101). When the power supply is activated (Yes in step S101), the initial stroke length (the initial counted value obtained by the rotary encoder 20) is set to the value not included in the measurement range (step S102). Subsequently, the measurement controller 30 determines whether the stroke length passes by the middle reset position (step S103). When the hydraulic cylinder does not pass by the middle reset position (No in step S103), the malfunction detection unit 30c does not output an error although the stroke length is the value not included in the measurement range (step S104), and repeats the determination process of step S103. Meanwhile, when the stroke length passes by the middle reset position (Yes in step S103), the measurement controller determines whether the measurement stroke length (counted value) is not included in the measurement range (step S105). When the measurement stroke length is not included in the measurement range (Yes in step S105), for example, an error is output from the notification unit 31d (step S106), and the determination process of step S105 is repeated. Meanwhile, when the measurement stroke length is included in the measurement range (No in step S105), the determination process is repeated.

[Initial Value Setting of Rotary Encoder During Activation of Power Supply]

The above-described measurement controller 30 stores the stroke a predetermined number of times based on the counted value using the phase A, the phase B, and the phase Z of the rotary encoder 20 and calculates the reference stroke length L2 or the measurement stroke length L1 by the average value. However, the counted value of the measurement controller 30 immediately after the activation of the power supply of the device may not be a correct counted value until the value is cleared to zero after the passage of the phase Z. Accordingly, there is a need to calibrate the stroke by using the counted value after the passage of the phase Z of the rotary encoder 20 immediately after the power supply of the measurement controller 30 is activated. Specifically, the measurement controller 30 stores the initial counted value of the rotary encoder 20 in advance during the activation of the power supply of the device. The initial counted value is set to a large value, for example, 9000 when the counted value of the measurement range of the rotary encoder 20 is ±3000.

As a result, the initial counted value of the rotary encoder 20 during the activation of the power supply of the device is large, and the deviation between the actual stroke length and the measurement stroke length corresponding to the initial counted value is large until the stroke length passes by the reference reset point of the rotary encoder 20. However, since the above-described calibration prohibition process control during the activation of the power supply of the device is performed, the error occurrence alarm is not generated.

[Rotary Encoder Reset Invalidation Setting]

When "OFF" as the reset invalidation setting is displayed by the calibration invalidation setting unit 31e, the calibration unit 30b does not reset the rotary encoder 20 by invalidating the calibration process.

[Stroke Operation Diagnosis Assisting Screen of Standard Monitor]

Figure 10:
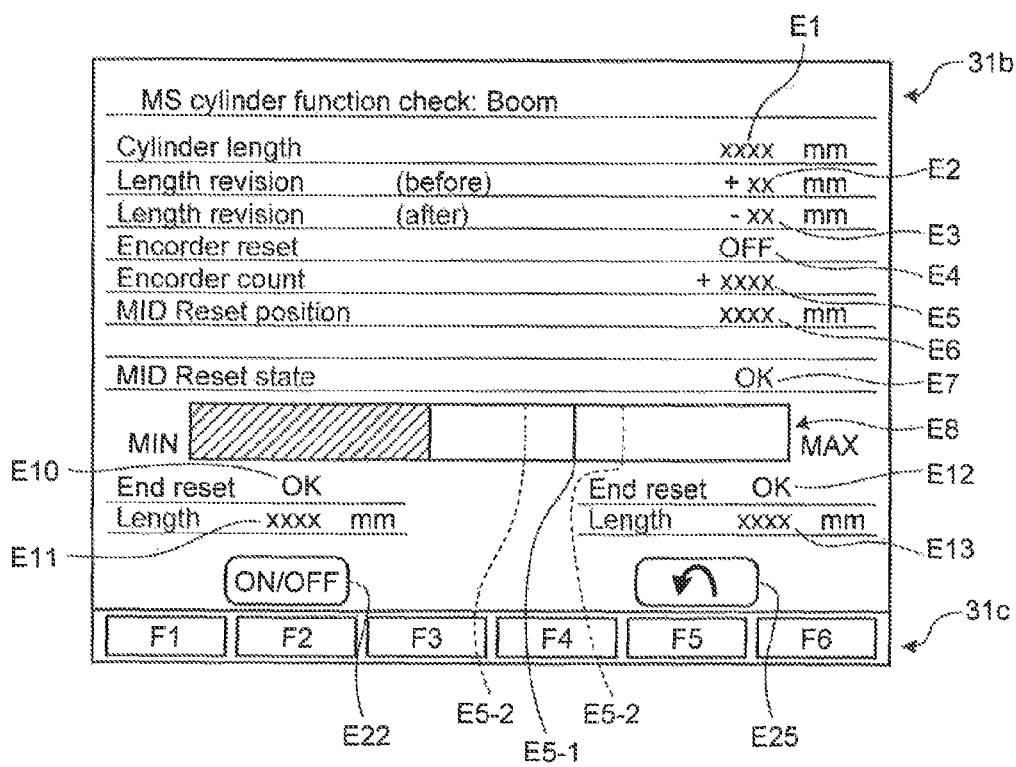
FIG. 10 is a diagram illustrating an example of a stroke operation diagnosis assisting screen of a first embodiment that is displayed on a display unit of a standard monitor.

The display unit 31b of the standard monitor 31 displays the stroke length measurement value obtained by the stroke sensor 10 and the stroke length calibration state obtained by the calibration unit 30b. FIG. 10 illustrates an example of the stroke operation diagnosis assisting screen displayed on the display unit 31b. The stroke operation diagnosis assisting screen illustrated in FIG. 10 is a screen when the boom cylinder is selected after the selection menus of the boom cylinder, the arm cylinder, and the bucket cylinder are displayed in a case where a service menu, a check menu, and a cylinder check are sequentially selected from the initial value screen.

An area E1 of the boom cylinder stroke operation diagnosis assisting screen illustrated in FIG. 10 displays a distance between cylinder pins calculated based on the measurement result of the stroke sensor 10 in real time. The distance between the cylinder pins indicates a distance between a minimum stroke end side attachment pin PA rotatably attaching the cylinder tube 4X illustrated in FIG. 7 to the vehicle body 1a and a maximum stroke end side attachment pin PB provided in one end of the cylinder rod 4Y to be rotatably attached to the boom cylinder 4f as the movable portion. Furthermore, the above-described stroke length indicates the stroke length L illustrated in FIG. 7, and is the distance between the cylinder pin distance Lmin to the minimum stroke end position and the cylinder pin distance Lmax to the maximum stroke end position.

Areas E2 and E3 below the area E1 display correction values obtained when the rotary encoder 20 is reset. For example, the difference L3 illustrated in FIG. 7 is displayed. The area E3 displays the latest correction value, and the area E2 displays the correction value just before the latest correction value. These correction values are updated whenever the rotary encoder 20 is reset. Furthermore, the invention is not limited to two areas E2 and E3, and three or more areas may be provided. Accordingly, the histories of the correction values may be diagnosed.

Further, an area E4 below the area E3 displays whether the reset of the rotary encoder 20 by the setting of the calibration invalidation setting unit 31e is a valid state or an invalid state. When "ON" is displayed, the reset is the valid state. Then, when "OFF" is displayed, the reset is the invalid state. Furthermore, the default of the display is set to "ON". The states of "ON" and "OFF" are changed by the operation of toggling a lower function key F2 corresponding to a lower area E22 of the screen. In this case, the function key F2 function as the calibration invalidation setting unit 31e. Furthermore, the operation unit 31c is disposed at the lower portion of the display unit 31b, and includes six function keys F1 to F6. On the contrary, the corresponding function icons are displayed on the lower portion of the screen corresponding to the six function keys F1 to F6. For example, in this screen, an icon representing the return function is displayed in a lower area E25 of the screen corresponding to the function key F5. Furthermore, the operation unit 31c includes other specific function keys or numeral keys. Further, the operation unit 31c may include a key independent from the standard monitor 31.

Further, an area E5 below the area E4 displays the counted value of the rotary encoder 20 in real time. In addition, an area E6 below the area E5 displays the reference stroke length L2 detected during the initial calibration.

Furthermore, an area E7 below the area E6 displays the characters of "OK", for example, in red in a highlighted state when the rotary encoder 20 may normally calculate the measurement stroke length at the time other than the initial calibration. Furthermore, the characters of "OK" disappear at the time point when the stroke becomes the opposite direction.

Further, the lower portion of the area E7 is provided with a bar-shaped area E8 that extends sideward. The left end of the bar indicates the minimum stroke end position, and the right end of the bar indicates the maximum stroke end position. Then, the stroke length corresponding to the value of the area E1 is displayed by changing the bar length. That is, the area E8 displays the stroke length measurement value of the stroke sensor 10 as a bar graph, and graphically displays a change in stroke in time. Further, the reference stroke length L2 during the initial calibration is displayed at the position E5-1 on the bar graph, and the position E5-2 indicating the stroke deviation amount allowable from the position E5-1 is displayed on the bar graph.

Further, an area E10 at the left and lower side of the area E8 displays the characters of "OK", for example, in red in a highlighted state as in the area E7 when the reset is performed at the minimum stroke end. Further, an area E12 at the right and lower side of the area E8 displays the characters of "OK", for example, in red in a highlighted state as in the area E7 when the reset is performed at the maximum stroke end. The highlight display of the area E10 and the area E12 disappears in a case other than the stroke end state. Further, when the reset is performed along with the highlight display of the areas E7, E10, and E12, the notification unit 31d outputs a sound.

Further, areas E11 and E13 below the area E10 and the area E12 display the minimum stroke end side cylinder pin distance and the maximum stroke end cylinder pin distance respectively obtained in advance.

Figure 11:
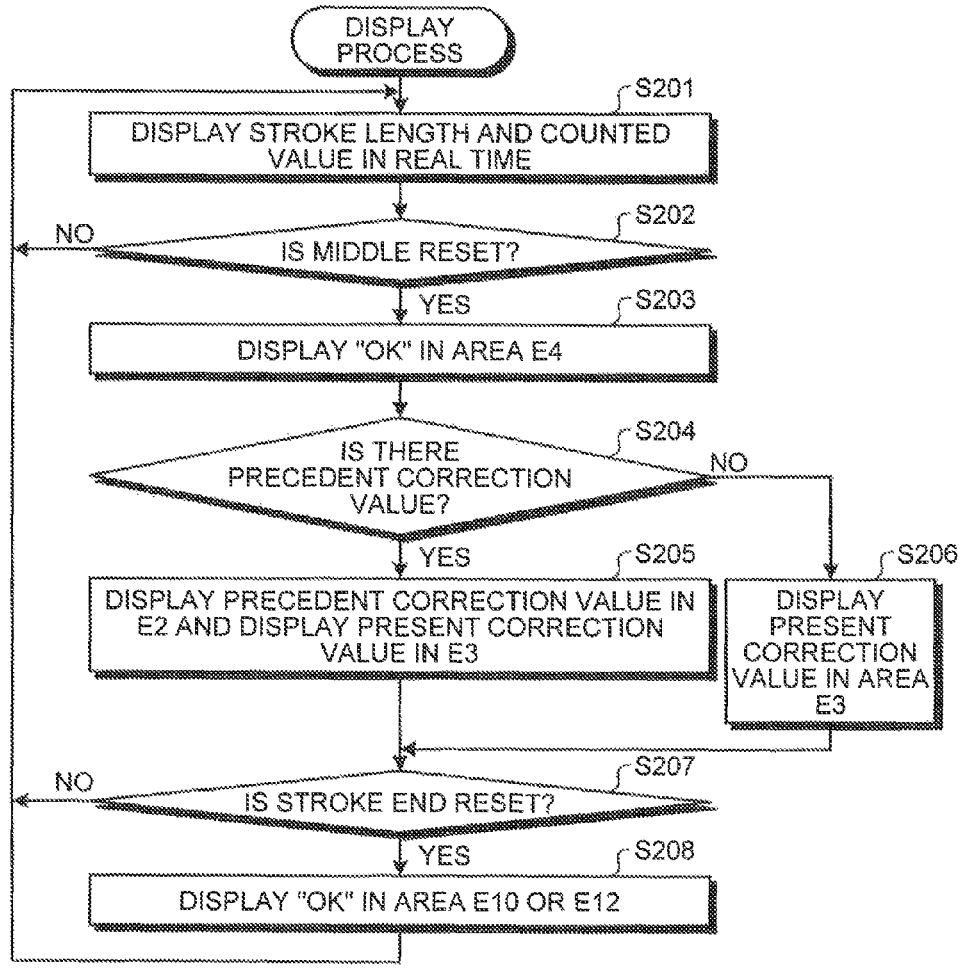
FIG. 11 is a flowchart illustrating a display process procedure of the display unit of the standard monitor.

Here, the outline of the display process of the stroke operation diagnosis assisting screen will be described with reference to the flowchart illustrated in FIG. 11. First, the standard monitor 31 obtains the counted value of the rotary encoder 20 and the present stroke length from the measurement controller 30, displays these in the areas E1 and E5 in real time, and displays the bar graph in the area E8 in real time (step S201). Subsequently, it is determined whether the middle reset process is normally performed by the notification from the measurement controller 30 (step S202). When the middle reset is normally performed (Yes in step S202), the area E4 displays "OK" (step S203). Further, it is determined whether the precedent correction value of the stroke length is stored (step S204). When the precedent correction value is stored (Yes in step S204), the precedent correction value is displayed in the area E2, the present correction value is displayed in the area E3 (step S205), and the routine proceeds to step S207. Meanwhile, when the precedent correction value is not stored (No in step S204), the present correction value is displayed in the area E3 (step S206), and the routine proceeds to step S207.

Subsequently, it is determined whether the stroke end reset is normally performed (step S207). When the stroke end reset is normally performed (Yes in step S207), the corresponding areas E10 and E12 display "OK" (step S208), and the routine proceeds to step S201. Then, when the stroke end reset is not normally performed (No in step S207), the routine directly proceeds to step S201.

Figure 12:
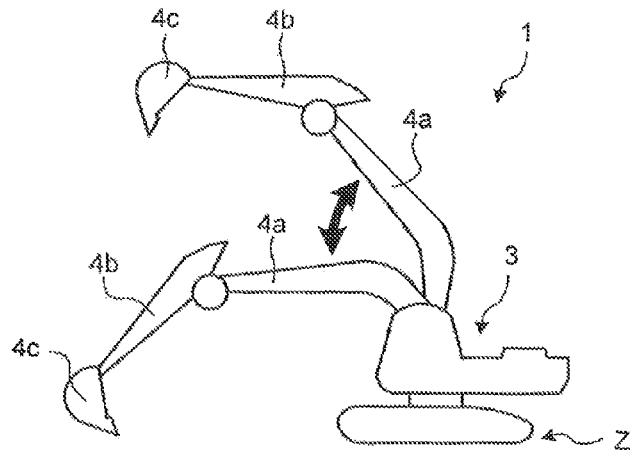
FIG. 12 is an explanatory diagram illustrating the operation of a working machine when performing a calibration process on a boom cylinder.

Further, the diagnosis of the stroke operation diagnosis assisting screen when the boom cylinder 4a is elevated will be specifically described. Furthermore, in this case, as illustrated in FIG. 12, only the boom cylinder 4a is elevated.

<Stroke Sensor Abnormality Check>

First, since the default of the area E4 is "ON", the function key F2 is long-pressed to become "OFF", so that the reset by the rotary encoder 20 is set to the invalid state. Then, an operation is performed which moves the boom 4a up from the installation state of the bucket 4c.

In this case, the stroke length reaches the maximum stroke end by the raising of the boom 4a, and the area E1 displays the cylinder pin distance in real time in the meantime. Further, when the stroke length reaches the maximum stroke end, the stroke end reset is performed, so that the area E2 displays the correction value. For example, when the correction value is not several millimeters, it is diagnosed that there is a possibility that the slip may occur in the stroke sensor 10. Further, since the area E8 graphically and continuously displays a change in stroke length as a bar, it is possible to diagnose the operation state of the stroke sensor 10 depending on whether the movement of the bar display is smooth. Furthermore, the reset by the rotary encoder 20 may be performed in the valid state instead of the invalid state. Here, since the reset by the rotary encoder 20 is invalidated by setting the invalid state, the graphical display of the area E8 may be diagnosed as the long stroke length. Accordingly, since there is no need to take an effort of diagnosing the hydraulic cylinder stroke operation by separating the connector of the rotary encoder 20, the diagnosis may be highly efficiently performed.

<Rotary Encoder Abnormality Check>

Further, it is possible to diagnose whether the rotary encoder 20 is broken by checking whether the counted value of the rotary encoder 20 displayed in the area E5 changes and the phase Z is input between the areas indicated by the positions E5-1 and E5-2 so that the counted value of the rotary encoder 20 is normally cleared to zero.

<Reset Operation Check: Reset Operation by Stroke End>

Further, since the area E12 shows the highlight display of "OK" and the activation of the reset for the reset at the maximum stroke end, it is possible to diagnose that the reset is normally performed at the maximum stroke end. When the highlight display of "OK" and the activation of the reset are not performed, it is possible to diagnose that the reset process of the stroke end is not operated.

<Reset Operation Check: Reset Operation of Reset Sensor>

Next, an operation is performed which moves the boom 4a down from the maximum stroke end. In this case, it is possible to diagnose that the reset process by the rotary encoder 20 is normally performed by checking the highlight display of "OK" and the activation of the reset in the area E7 when the reset by the rotary encoder 20 is performed. When the highlight display of "OK" and the activation of the reset are not performed, it is possible to diagnose that the reset process of the rotary encoder 20 is not operated and the rotary encoder 20 is broken.

According to the above-described configuration, since at least the stroke length measurement value of the stroke sensor 10 and the calibration state of the calibration unit 30b are displayed on the stroke operation diagnosis assisting screen, the stroke operation may be simply and easily diagnosed.

In particular, since a change in time of the stroke length measurement value of the stroke sensor 10 is directly and graphically displayed, the slip operation of the stroke sensor may be diagnosed in detail.

Further, since the reset is prohibited until the stroke length passes by the reference reset point when the power supply of the device is activated, the initial reset process may be smoothly performed without generating the alarm of the error.

Further, since the initial stroke value of the rotary encoder 20 when the power supply of the device is activated is set to the value not included in the stroke length measurement range of the stroke sensor 10, the initial reset process may be normally performed by preventing the erroneous reset process due to the occurrence of the noise until the initial reset process.

Second Embodiment

In the above-described first embodiment, the stroke operation may be simply and easily performed by displaying and outputting the stroke length measurement value and the calibration state on the hydraulic cylinder stroke operation diagnosis assisting screen. In the second embodiment, the initial calibration operation may be easily performed by displaying the initial stroke calibration operation assisting screen of the hydraulic cylinder on the display unit 33b of the HMI monitor 33.

As described above, the initial calibration operation indicates an operation in which the reference stroke length L2 is obtained and stored when the hydraulic cylinder stroke operation diagnosis assisting device is shipped from a factory or the reset sensor is replaced. Then, when the working machine is activated, a calibration process such as a reset of the stroke length is performed based on the reference stroke length L2 subjected to the initial calibration process. When the initial calibration operation is performed, the service man performs the initial calibration operation based on his/her checklist.

Figure 13:
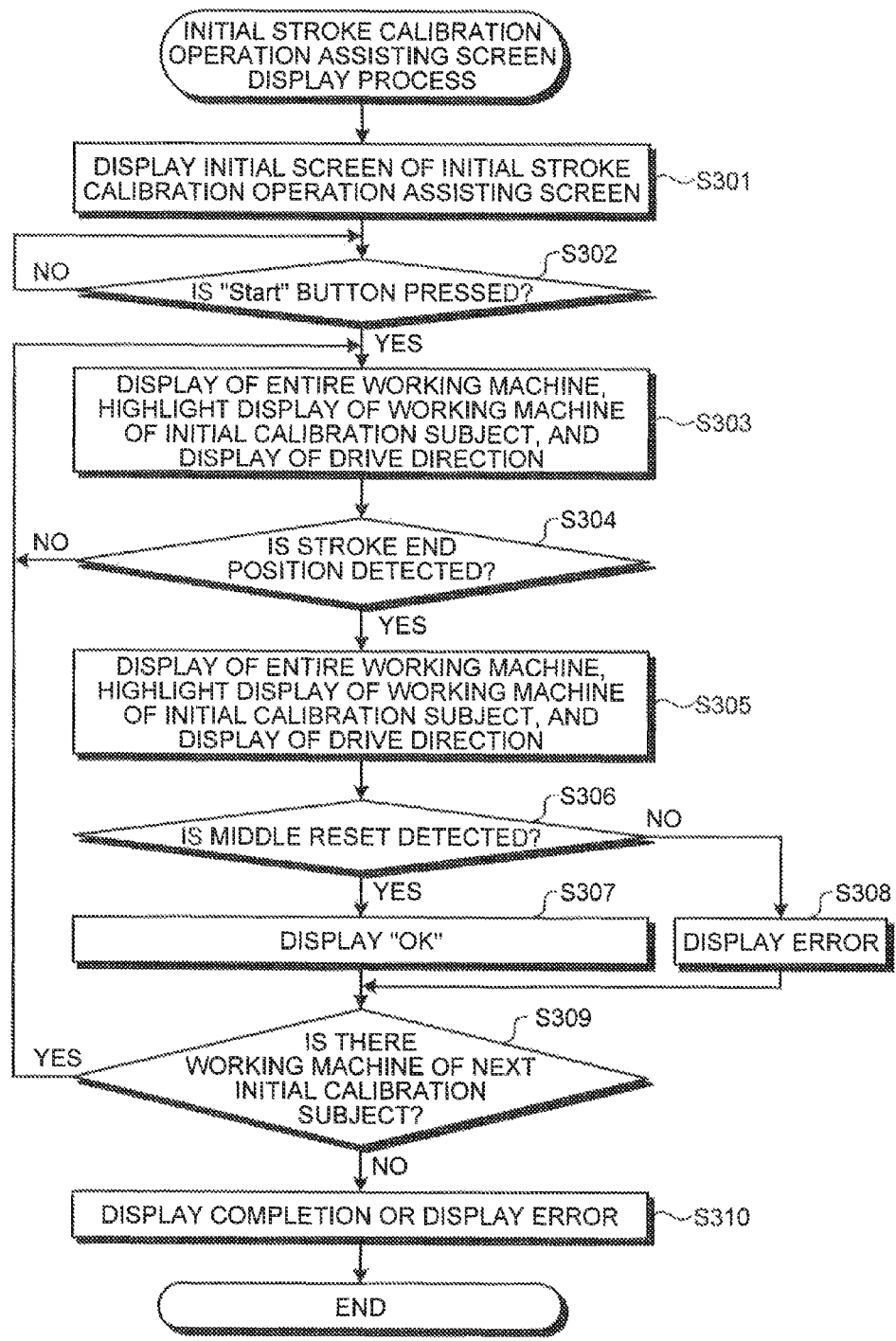
FIG. 13 is a flowchart illustrating a display process procedure of an initial stroke calibration operation assisting screen of a second embodiment displayed on a display unit of an HMI monitor.

Here, an operation of assisting the initial calibration operation will be described based on the flowchart illustrated in FIG. 13 and the example of the initial stroke calibration operation assisting screen illustrated in FIGS. 14-1 to 14-10. First, in the initial stroke calibration operation assisting screen, when the service menu is selected from the initial value screen and the initial calibration operation menu is selected, the initial stroke calibration operation assisting screen illustrated in FIG. 14-1 or 14-2 is displayed on the display unit 33b (step S301).

In the initial stroke calibration operation assisting screen illustrated in FIG. 14-1, when the initial calibration operation of the hydraulic cylinder is not performed, the status of the initial calibration subject is displayed as "READY". Meanwhile, in the initial stroke calibration operation assisting screen illustrated in FIG. 14-2, when the initial calibration operation of the hydraulic cylinder is performed and the reference stroke length L2 is input to the measurement controller 30, the status of the initial calibration subject is displayed as "OK". The determination of selecting the screen of FIG. 14-1 or FIG. 14-2 is performed by the calculation unit 31a of the HMI monitor 33 based on the state where the reference stroke length L2 is input to the measurement controller 30.

In the screens of FIGS. 14-1 and 14-2, the upper side of the screen displays the operation outlines, which needs to be performed, of the respective hydraulic cylinders and the instruction in which the engine is rotated at the low engine speed and then the start button is pressed. Further, at the center of the screen, the entire posture of the excavator equipped with the hydraulic cylinder before the initial calibration operation is graphically displayed at the left side in the screen, and the posture after the initial calibration operation is graphically displayed at the right side in the screen. Furthermore, at the lower side of the screen, the status of the initial calibration operations of the respective hydraulic cylinders are displayed in an area E30. In the screen of FIG. 14-1, since the initial calibration operation is not performed, "READY" is displayed for each hydraulic cylinder. Further, in the screen of FIG. 14-2, since the initial calibration operation is performed, "OK" is displayed for each hydraulic cylinder.

In a case where the screen of FIG. 14-1 is displayed, when the "Start" button displayed in the area E31 is long-pressed, for example, for 0.5 seconds or more in accordance with the displayed instruction (step S302), the initial stroke calibration operation assisting screen illustrated in FIG. 14-3 appears. Meanwhile, in a case where the screen of FIG. 14-2 is displayed and the initial calibration operation is performed, when the "Clear" button displayed in the area E32 is long-pressed, for example, for 0.5 seconds or more, the screen illustrated in FIG. 14-1 appears. In this case, the calculation unit 33a performs an instruction of resetting the data of the reference stroke L2 presently input to the measurement controller 30. As a result, all status of the area E30 becomes "READY".

In the screen illustrated in FIG. 14-3, the highlight display unit 33e graphically displays the entire posture of the excavator at the center of the screen, and performs the highlight display in which the color or the color tone of the bucket as the working machine of the calibration subject changes so as to be different from that of the other working machines. Further, the highlight display unit 33e displays an arrow indicating the bucket operation direction (step S303). The service man operates the bucket lever in the "DUMP" direction until the status of the bucket changes to "DIG" based on the graphical display and the work content displayed at the upper portion of the screen. The lower portion of the screen indicates that the work step is Step 1. Subsequently, when the calculation unit 33a detects the relief state by the stroke end position in the "DUMP" direction of the bucket (Yes in step S304), the screen of FIG. 14-4 appears. Furthermore, it is described that the color of the working machine as the calibration subject is changed when the highlight display is performed, but the color or the color tone of the other working machines may be changed.

In the screen illustrated in FIG. 14-4, the highlight display unit 33e graphically displays the entire posture of the excavator at the center of the screen, and performs the highlight display in which the color or the color tone of the bucket as the working machine of the calibration subject changes so as to be different from that of the other working machines. In addition, the highlight display unit 33e displays an arrow indicating the bucket operation direction (step S305). The service man slowly operates the bucket lever in the "DIG" direction until the status of the bucket changes to "OK" based on the graphical display and the work content displayed at the upper portion of the screen. The lower portion of the screen indicates that the work step is Step 2. When the calculation unit 33a detects the reference stroke L2 during the operation of the bucket in the "DIG" direction (Yes in step S306) and detects the relief state by the stroke end position, the status of the bucket is displayed as "OK" (step S307), the reference stroke L2 is input to the measurement controller 30. Subsequently, since there is a working machine (arm) as the next initial calibration subject (Yes in step S309), a calculation unit 22a changes the present screen to the screen illustrated in FIG. 14-5.

In the screen illustrated in FIG. 14-5, the highlight display unit 33e graphically displays the entire posture of the excavator at the center of the screen, and performs the highlight display in which the color or the color tone of the arm as the working machine of the calibration subject changes so as to be different from that of the other working machines. Further, the highlight display unit 33e displays an arrow indicating the arm operation direction (step S303). The service man operates the arm lever in the "DUMP" direction until the status of the arm changes to "DIG" based on the graphical display and the work content displayed at the upper portion of the screen. The lower portion of the screen indicates that the work step is Step 3. Subsequently, when the calculation unit 33a detects the relief state by the stroke end position in the "DUMP" direction of the arm (Yes in step S304), the screen of FIG. 14-6 appears.

In the screen illustrated in FIG. 14-6, the highlight display unit 33e graphically displays the entire posture of the excavator at the center of the screen, and performs the highlight display in which the color or the color tone of the arm as the working machine of the calibration subject changes so as to be different from that of the other working machines. Further, the highlight display unit 33e displays an arrow indicating the arm operation direction (step S305). The service man gradually operates the arm lever in the "DIG" direction until the status of the arm changes to "OK" based on the graphical display and the work content displayed at the upper portion of the screen. The lower portion of the screen indicates that the work step is Step 4. When the calculation unit 33a detects the reference stroke length L2 during the operation of the arm in the "DIG" direction (Yes in step S306) and detects the relief state by the stroke end position, the calculation unit displays the status of the arm as "OK" (step S307) and inputs the reference stroke length L2 to the measurement controller 30. Subsequently, since there is the working machine (boom) as the next initial calibration subject (Yes in step S309), the calculation unit 33a changes the present screen to the screen illustrated in FIG. 14-7.

In the screen illustrated in FIG. 14-7, the highlight display unit 33e graphically displays the entire posture of the excavator at the center of the screen, and performs the highlight display in which the color or the color tone of the boom as the working machine of the calibration subject changes so as to be different from that of the other working machines. Further, the highlight display unit 33e displays an arrow indicating the boom operation direction (step S303). The service man operates the boom lever in the "UP" direction until the status of the boom changes to "DOWN" based on the graphical display and the work content displayed at the upper portion of the screen. The lower portion of the screen indicates that the work step is Step 5. Subsequently, when the calculation unit 33a detects the relief state by the stroke end position in the "UP" direction of the boom (Yes in step S304), the screen of FIG. 14-8 appears.

In the screen illustrated in FIG. 14-8, the highlight display unit 33e graphically displays the entire posture of the excavator at the center of the screen, and performs the highlight display in which the color or the color tone of the boom as the working machine of the calibration subject changes so as to be different from that of the other working machine. Further, the highlight display unit 33e displays an arrow indicating the boom operation direction (step S305). The service man gradually operates the boom lever in the "DOWN" direction until the working machine reaches a ground surface based on the graphical display and the work content displayed at the upper portion of the screen. The lower portion of the screen indicates that the work step is Step 6. When the calculation unit 33a detects the reference stroke length L2 during the operation of the boom in the "DOWN" direction (Yes in step S306), the calculation unit displays the status of the boom as "OK" (step S307) and inputs the reference stroke length L2 to the measurement controller 30. Subsequently, since there is no working machine as the next initial calibration subject (No in step S309), the calculation unit 33a changes the present screen to the screen illustrated in FIG. 14-9.

Figure 9:
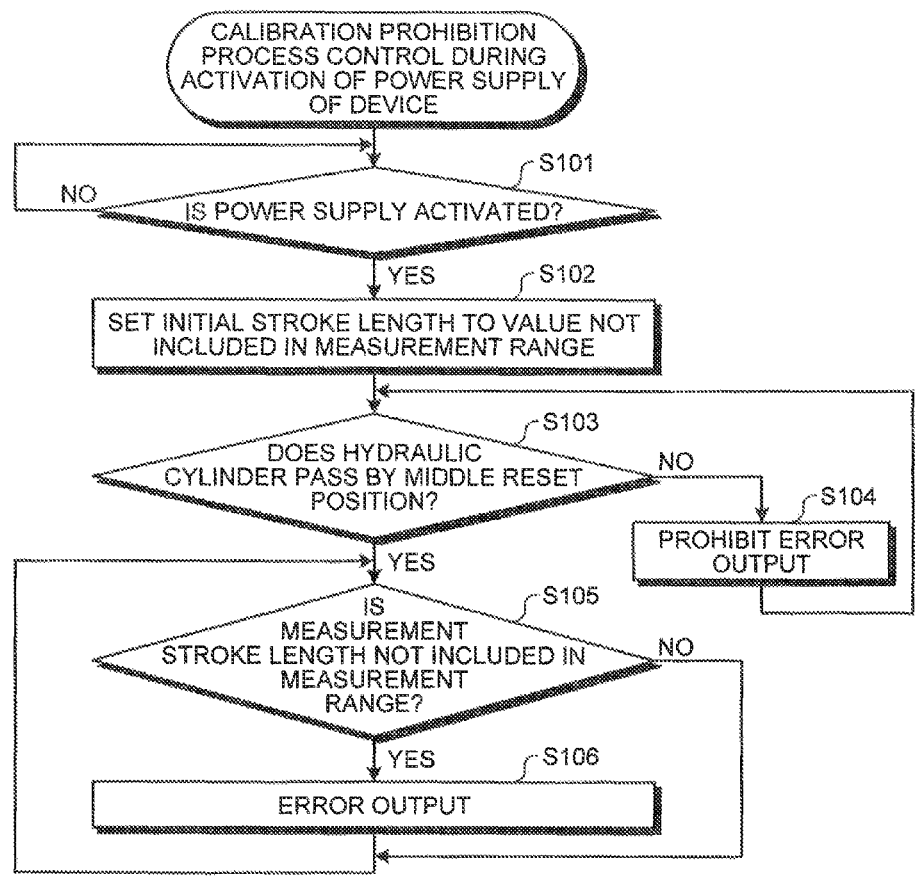
FIG. 9 is a flowchart illustrating a calibration prohibition process control procedure during the activation of a power supply.

In the screen illustrated in FIG. 14-9, all status of the hydraulic cylinders is displayed as "OK", which indicates that the initial calibration operation is completed (step S310). Further, when the bucket, the arm, and the boom are moved in a reciprocating manner, the reset positions are recognized, and the check button of the area E33 is pressed after the reciprocating movement, the initial calibration operation is completed. Then, the calculation unit 33a performs a process of returning to the menu screen.

Furthermore, the above-described initial calibration operation is performed in order of the bucket, the arm, and the boom, but the invention is not limited thereto. For example, in a case where the initial calibration operation is performed on the arm, the initial calibration operation of the other calibration subject is performed regardless of the procedure of the initial calibration operation after the initial calibration operation for the arm ends. When the initial calibration operations for all hydraulic cylinders end, the screen illustrated in FIG. 14-9 is displayed.

Further, the calibration of the calibration subject is not successfully performed (No in step S306), the screen of FIG. 14-10 appears. Then, the calculation unit 33a displays an error code in the area E34 (step S308). Accordingly, the error content and the correspondence content corresponding to the error code may be understood. The error content and the correspondence content corresponding to the error code may be automatically displayed on the screen. Furthermore, when the calibration of the calibration subject is not successfully performed, the reference stroke length L2 is not updated, and the currently stored reference stroke length L2 is maintained.

Furthermore, the calculation unit 33a generates an alarm for the attention through the notification unit 33d when the initial calibration operation of the hydraulic cylinder is not completed yet. The calculation unit 33a determines whether the initial calibration operation is not completed yet depending on whether the reference stroke length L2 is input to the measurement controller 30.

Further, when the HMI monitor 33 may receive information from a communication satellite through the position information detecting unit 19 and the antennas 9, the position information detecting unit 19 calculates the position and the direction of the excavator 1 based on the received position information, and outputs the result as the vehicle position information to the main controller 32 and the HMI monitor 33. Meanwhile, the work position information in the horizontal and vertical directions of the blade edge of the working machine 4 is obtained by the measurement controller 30, and is output to the main controller 32 and the HMI monitor 33. The main controller 32 and the HMI monitor 33 may automatically control the blade edge of the working machine 4 based on the vehicle position information, the work position information, and the three-dimensional work information. When a communication error occurs between the main controller 32 and the HMI monitor 33 during the initial calibration operation, a pop-up error screen is displayed on the display screen. In this case, when the button corresponding to the "return" of the pop-up error screen is pressed, the initial calibration process is stopped, and the present screen returns to the menu screen. In this case, the initial calibration operation using the initial stroke calibration operation assisting screen is performed after the error is solved.

In the second embodiment, the calculation unit 33a of the HMI monitor 33 performs control in which the initial stroke calibration operation assisting screen is changed based on the input of the operation unit 33c and the detection of the operation state of the working machine, the reference stroke length L2 as the calibration result is input, and the error screen is displayed. As a result, the service man may complete the initial calibration operation just by performing a simple input from the operation unit 33c through the operation of the working machine in accordance with the initial stroke calibration operation assisting screen.

Furthermore, in the above-described first and second embodiments, as for the reset of the reset sensor or the reset of the stroke end, it is desirable to perform the reset process not in both stroke directions, but in one stroke direction. This is because the process is complex in that the reset position has directivity and the reset process needs to be performed in each direction. For example, the bucket cylinder 4d and the arm cylinder 4e perform the reset process only in the cylinder extension direction, and the boom cylinder 4f performs the reset process only in the cylinder contraction direction. The reason why the reset process of the boom cylinder 4f is performed in the cylinder contraction direction is that the contraction-side stroke end of the boom cylinder 4f is located below the ground level of the working machine and hence may not be used in general. Further, in the second embodiment, the initial calibration operation assisting screen is displayed on the HMI monitor 33, but the initial value configuration assisting screen may be displayed on the standard monitor 31.

REFERENCE SIGNS LIST

1 EXCAVATOR
1a VEHICLE BODY
2 LOWER RUNNING BODY
2a CRAWLER TRACK
3 UPPER SWING BODY
3a ENGINE
4 WORKING MACHINE
4a BOOM
4b ARM
4c BUCKET
4d BUCKET CYLINDER
4e ARM CYLINDER
4f BOOM CYLINDER
4X CYLINDER TUBE
4W CYLINDER HEAD
4Y CYLINDER ROD
4V PISTON
5 CAB
6 ENGINE ROOM
7 COUNTER WEIGHT
8 DRIVER SEAT
9 ANTENNA
10 STROKE SENSOR
11 ROTATION ROLLER
12 ROTATION SHAFT
13 ROTATION SENSOR UNIT
13a MAGNET
13b HALL IC
14 CASING
19 POSITION INFORMATION DETECTING UNIT
20 ROTARY ENCODER
20a MAGNETIC SENSOR
25 DISK PORTION
25a, 25b TRANSMISSION PORTION
26 LIGHT EMITTING PORTION
27 LIGHT RECEIVING PORTION
27a LIGHT RECEIVING ELEMENT
30 MEASUREMENT CONTROLLER
30a STROKE END DETECTION UNIT
30b CALIBRATION UNIT
30c MALFUNCTION DETECTION UNIT
31 STANDARD MONITOR
31a, 33a CALCULATION UNIT
31b, 33b DISPLAY UNIT
31c, 33c OPERATION UNIT
31d, 33d NOTIFICATION UNIT
31e CALIBRATION INVALIDATION SETTING UNIT
32 MAIN CONTROLLER
33 HMI MONITOR
33e HIGHLIGHT DISPLAY UNIT
40h ROD-SIDE OIL CHAMBER
40b CAP-SIDE OIL CHAMBER
61 MAGNETIC SENSOR
63 MAGNET
101, 101R, 101L OPERATION LEVER UNIT
101Ra, 101Rb OPERATION LEVER
101Rb, 101Lb DETECTION UNIT
102 CONTROL VALVE
103 HYDRAULIC PUMP
103a SWASH PLATE
104 SERVO MECHANISM
105 ENGINE DRIVING MECHANISM
106 EJECTION PASSAGEWAY
107, 108 PASSAGEWAY
109 BATTERY
110 ENGINE KEY SWITCH
d ROTATION RADIUS
E1 to E8, E10, E12, E22, E30 to E34 AREA
F1, F2, F5 FUNCTION KEY
L STROKE LENGTH
L1 MEASUREMENT STROKE LENGTH
L2 REFERENCE STROKE LENGTH
L3 DIFFERENCE
N NETWORK
PA, PB ATTACHMENT PIN

The invention claimed is:
1. A hydraulic cylinder stroke operation diagnosis assisting device comprising:
movable portions that are sequentially supported by a vehicle body in a rotatable manner;
a hydraulic cylinder that is disposed between the vehicle body and each movable portion or between the movable portions so as to support the movable portions in a rotatable manner;
a stroke sensor that is disposed in the hydraulic cylinder so as to measure a stroke length of the hydraulic cylinder;
a reset sensor that measures a reference reset point in which a value of the stroke length measured by the stroke sensor is reset;
a stroke end detection unit that detects a stroke end position of the hydraulic cylinder;
a calibration unit that calibrates the measured value of the stroke length when the reference reset point and/or the stroke end position are detected; and
a monitor that displays at least the value of the stroke length measured by the stroke sensor and a calibration state by the calibration unit on a screen,
wherein the monitor displays a correction value of the measured value of the stroke length calculated by the calibration unit.
2. The hydraulic cylinder stroke operation diagnosis assisting device according to claim 1,
wherein the monitor displays a plurality of the correction values continued in time series.

3. The hydraulic cylinder stroke operation diagnosis assisting device according to claim 1,
   wherein the reset sensor includes a rotary encoder that measures a rotation angle of each movable portion, and
   wherein the reference reset point is a middle reset position other than the stroke end.

4. The hydraulic cylinder stroke operation diagnosis assisting device according to claim 1,
   wherein the reset sensor includes a magnetic sensor that is provided in an outer periphery of a cylinder tube of the hydraulic cylinder so as to detect a magnet disposed in a piston of a rod end of the hydraulic cylinder, and
   wherein the reference reset point is a middle reset position other than the stroke end.

5. A hydraulic cylinder stroke operation diagnosis assisting method comprising:
   detecting a reference reset point of a reset sensor and/or a stroke end position of a hydraulic cylinder to calibrate a stroke length of the hydraulic cylinder when the stroke length is measured by a stroke sensor disposed in the hydraulic cylinder; and
   displaying at least a value of the stroke length measured by the stroke sensor and a calibration state of the stroke length based on a detected result in the detecting,
   displaying a correction value of the value of the stroke length measured by the stroke sensor and calculated by the calibration unit.

* * * * *